United States Patent [19]

Yoshida

[11] Patent Number: 5,928,372

[45] Date of Patent: Jul. 27, 1999

[54] METHOD AND APPARATUS FOR VERIFYING DATA TRANSFER IN DATA PROCESSOR EQUIPPED WITH EXTERNAL RECORDING UNIT

[75] Inventor: Osamu Yoshida, Higashine, Japan

[73] Assignee: Fujitsu Limited, Kawasaki, Japan

[21] Appl. No.: 08/960,855

[22] Filed: Oct. 30, 1997

[30] Foreign Application Priority Data

Jan. 11, 1996 [JP] Japan .................................. 8-291932

[51] Int. Cl.⁶ .................................................. G06F 11/00
[52] U.S. Cl. ........................ 714/704; 714/752; 714/807; 714/799; 714/819
[58] Field of Search .................................. 371/37.01, 53, 371/48, 37.7, 5.1; 714/752, 807, 799, 704, 819

[56] References Cited

FOREIGN PATENT DOCUMENTS 612269  1/1994  Japan .

Primary Examiner—Phung M. Chung
Attorney, Agent, or Firm—Greer, Burns, & Crain

[57] ABSTRACT

A method and an apparatus for verifying data transfer between a data processor having an ATA interface and an external recording unit, capable of reliably preventing a data transfer error while establishing compatibility with existing systems. When data is transferred between a data processor and an external recording unit connected by ATAI/F, a data check code is calculated, in the first stage, on the side of the data processor by regarding the transfer data as serial data, the data check code is calculated, in the second stage, on the side of the external recording unit by regarding this transfer data as serial data, the data check codes calculated on the sides of the data processor and the external recording unit are compared, in the third stage, after completion of the data transfer, and in the fourth stage, the data transfer is judged as normal when the two data check codes coincide with each other and is not judged as normal when they do not coincide, so as to prevent the occurrence of an error in the data transfer. The data verification apparatus is equipped with means for accomplishing the stages described above.

34 Claims, 28 Drawing Sheets

Fig.1 PRIOR ART

| PIN No. | SIGNAL NAME | PIN No. | SIGNAL NAME |
|---|---|---|---|
| 1 | GND | 2 | -DB0 |
| 3 | GND | 4 | -DB1 |
| 5 | GND | 6 | -DB2 |
| 7 | GND | 8 | -DB3 |
| 9 | GND | 10 | -DB4 |
| 11 | GND | 12 | -DB5 |
| 13 | GND | 14 | -DB6 |
| 15 | GND | 16 | -DB7 |
| 17 | GND | 18 | -DBP |
| 19 | GND | 20 | GND |
| 21 | GND | 22 | GND |
| 23 | RESERVE | 24 | RESERVE |
| 25 | OPEN | 26 | TERMPWR |
| 27 | RESERVE | 28 | RESERVE |
| 29 | GND | 30 | GND |
| 31 | GND | 32 | -ATN |
| 33 | GND | 34 | GND |
| 35 | GND | 36 | -BSY |
| 37 | GND | 38 | -ACK |
| 39 | GND | 40 | -RST |
| 41 | GND | 42 | -MSG |
| 43 | GND | 44 | -SEL |
| 45 | GND | 46 | -C/D |
| 47 | GND | 48 | -REQ |
| 49 | GND | 50 | -I/O |

-DB0~7: DATA SIGNAL
-DBP: PARITY SIGNAL
TERMPWR: TERMINATING RESISTOR POWER SOURCE
-ATN: ATTENTION
-BSY: BUSY SIGNAL
-ACK: ACKNOWLEDGE SIGNAL
-RST: RESET SIGNAL
-MSG: MESSAGE SIGNAL
-SEL: SELECTION SIGNAL
-C/D: COMMAND/DATA SELECT SIGNAL
-REQ: REQUEST SIGNAL
-I/O: IN-OUT SELECT SIGNAL
GND: GROUND

Fig.4 PRIOR ART

| PIN NUMBER | SIGNAL NAME | PIN NUMBER | SIGNAL NAME |
|---|---|---|---|
| 1 | RESET- | 2 | GND |
| 3 | DATA7 | 4 | DATA8 |
| 5 | DATA6 | 6 | DATA9 |
| 7 | DATA5 | 8 | DATA10 |
| 9 | DATA4 | 10 | DATA11 |
| 11 | DATA3 | 12 | DATA12 |
| 13 | DATA2 | 14 | DATA13 |
| 15 | DATA1 | 16 | DATA14 |
| 17 | DATA0 | 18 | DATA15 |
| 19 | GND | 20 | (KEY) |
| 21 | DMARQ | 22 | GND |
| 23 | IOW- | 24 | GND |
| 25 | IOR- | 26 | GND |
| 27 | IORDY- | 28 | CSEL |
| 29 | DMACK- | 30 | GND |
| 31 | INTRQ | 32 | IOCS16- |
| 33 | DA1 | 34 | PDIAG- |
| 35 | DA0 | 36 | DA2 |
| 37 | CS1FX- | 38 | CS3FX- |
| 39 | DASP- | 40 | GND |

RESET-: RESET SIGNAL
DATA0~15: DATA SIGNAL
IOW-: WRITE STROBE SIGNAL
IOR-: READ STROBE SIGNAL
IORDY: DELAY REQUEST SIGNAL
DMACK: DMA RESPONSE SIGNAL
INTRQ: INTERRUPT REQUEST SIGNAL
DA0~2: ADDRESS SIGNAL
CS1FX-: CHIP SELECT SIGNAL
DASP-: TIME MULTIPLEX SIGNAL
CSEL: DEVICE SET SIGNAL
IOCS16-: DATA TRANSFER SIGNAL
PDIAG: SELF DIAGNOSIS END REPORT SIGNAL
CS3FX-: CHIP SELECT SIGNAL
GND: GROUND

Fig. 5
PRIOR ART

| CS1FX- | CS3FX- | DA2 | DA1 | DA0 | TASK FILE REGISTER | |
|---|---|---|---|---|---|---|
| | | | | | READ | WRITE |
| 1 | 0 | 0 | 0 | 0 | DATA | DATA |
| 1 | 0 | 0 | 0 | 1 | ERROR | FEATURES |
| 1 | 0 | 0 | 1 | 0 | SECTOR COUNT | SECTOR COUNT |
| 1 | 0 | 0 | 1 | 1 | SECTOR NUMBER | SECTOR NUMBER |
| 1 | 0 | 1 | 0 | 0 | CYLINDER LOW | CYLINDER LOW |
| 1 | 0 | 1 | 0 | 1 | CYLINDER HIGH | CYLINDER HIGH |
| 1 | 0 | 1 | 1 | 0 | DEVICE/HEAD | DEVICE/HEAD |
| 1 | 0 | 1 | 1 | 1 | STATUS | COMMAND |
| 1 | 1 | X | X | X | INVALID | INVALID |
| 0 | 1 | 1 | 1 | 0 | ALTERNATE STATUS | DEVICE CONTROL |
| 0 | 1 | 1 | 1 | 1 | — | — |

Fig. 6
PRIOR ART
| STATUS REGISTER | | | | | | | |
|---|---|---|---|---|---|---|---|
| BIT7 | BIT6 | BIT5 | BIT4 | BIT3 | BIT2 | BIT1 | BIT0 |
| BSY | DRDY | DF | '1' | DRQ | CORR | '0' | ERR |
Fig. 7
PRIOR ART
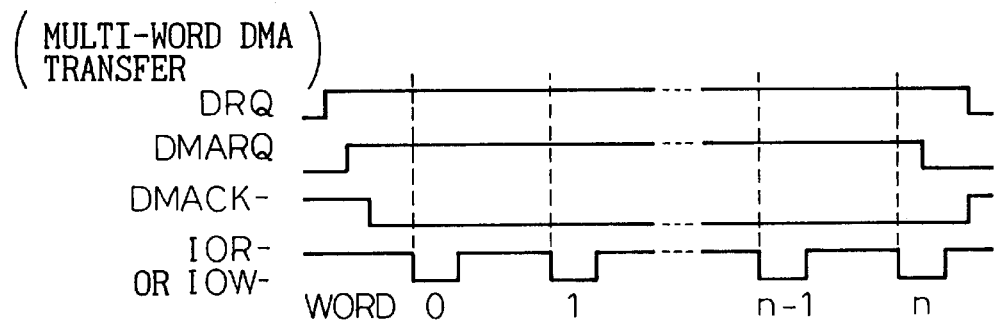
Fig. 8
PRIOR ART
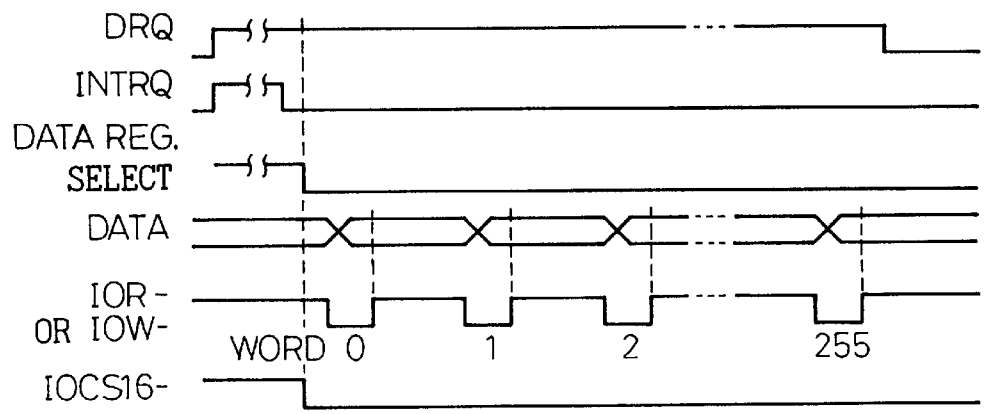

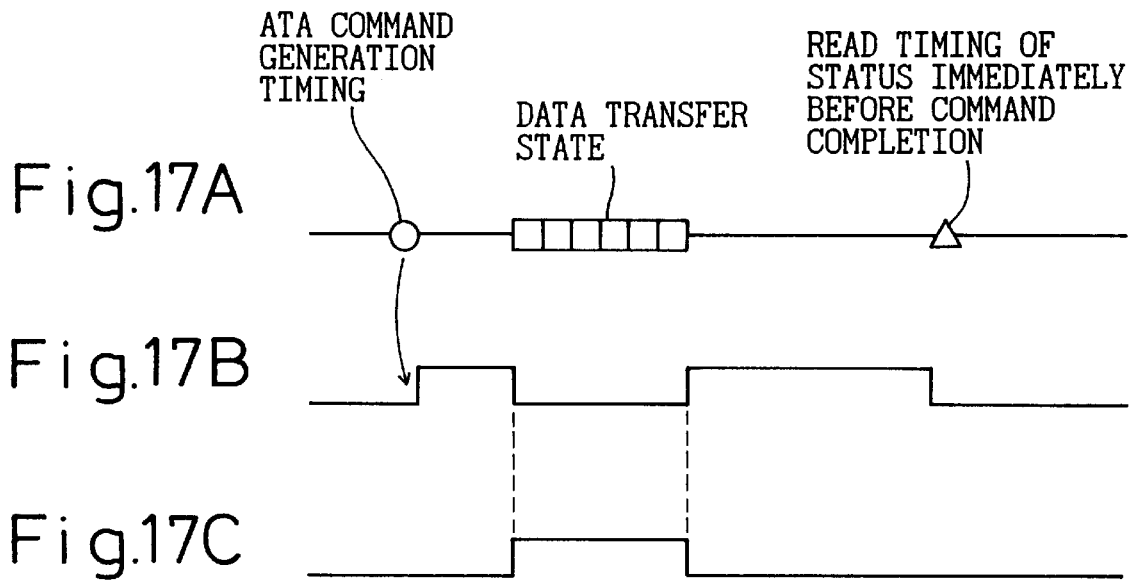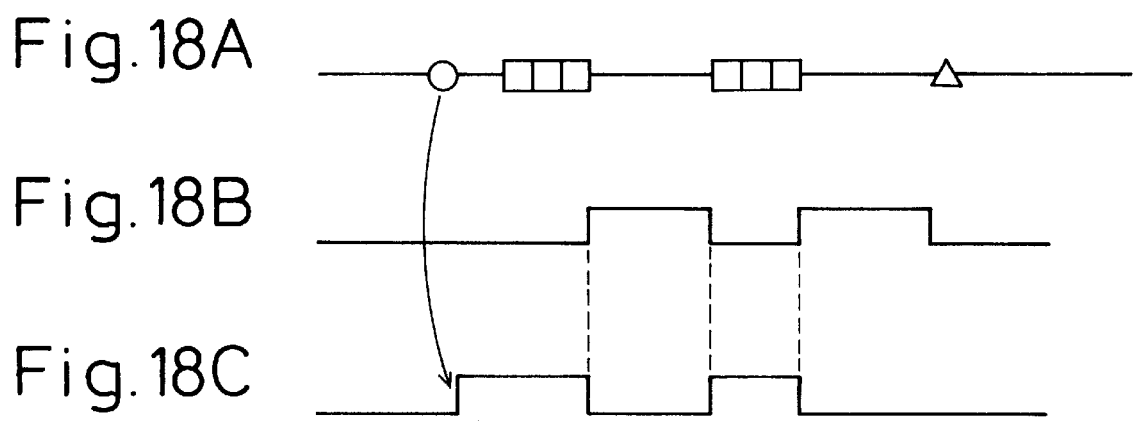

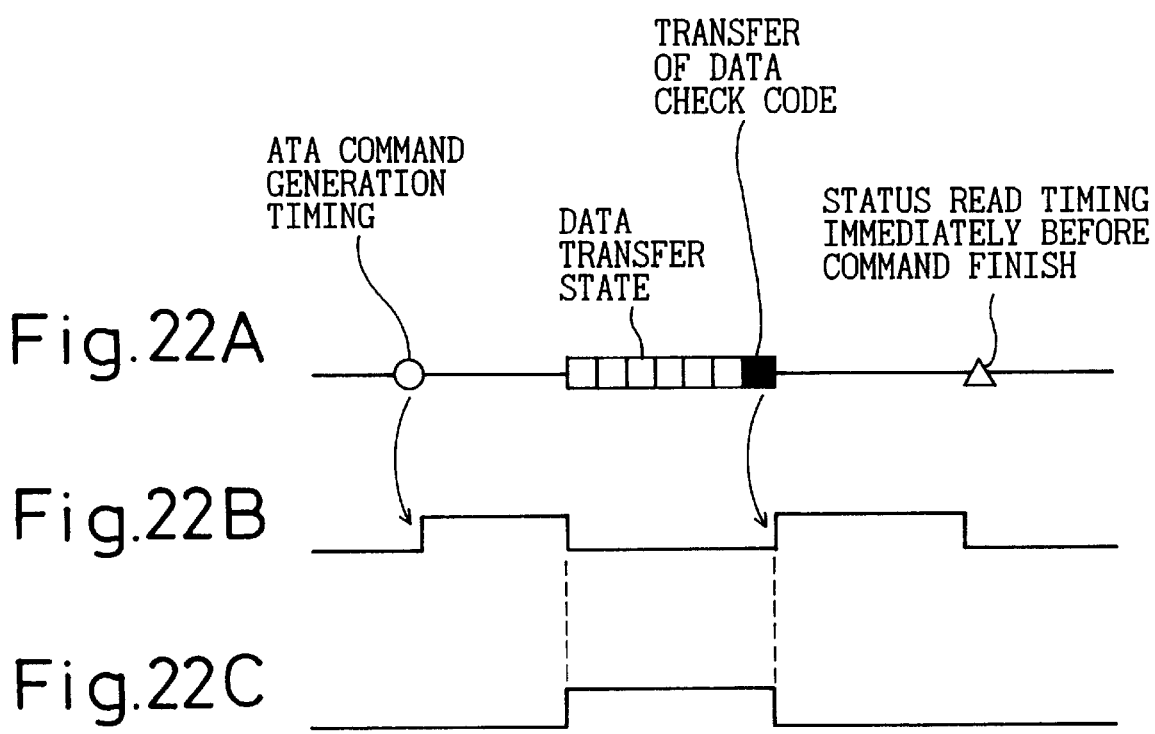

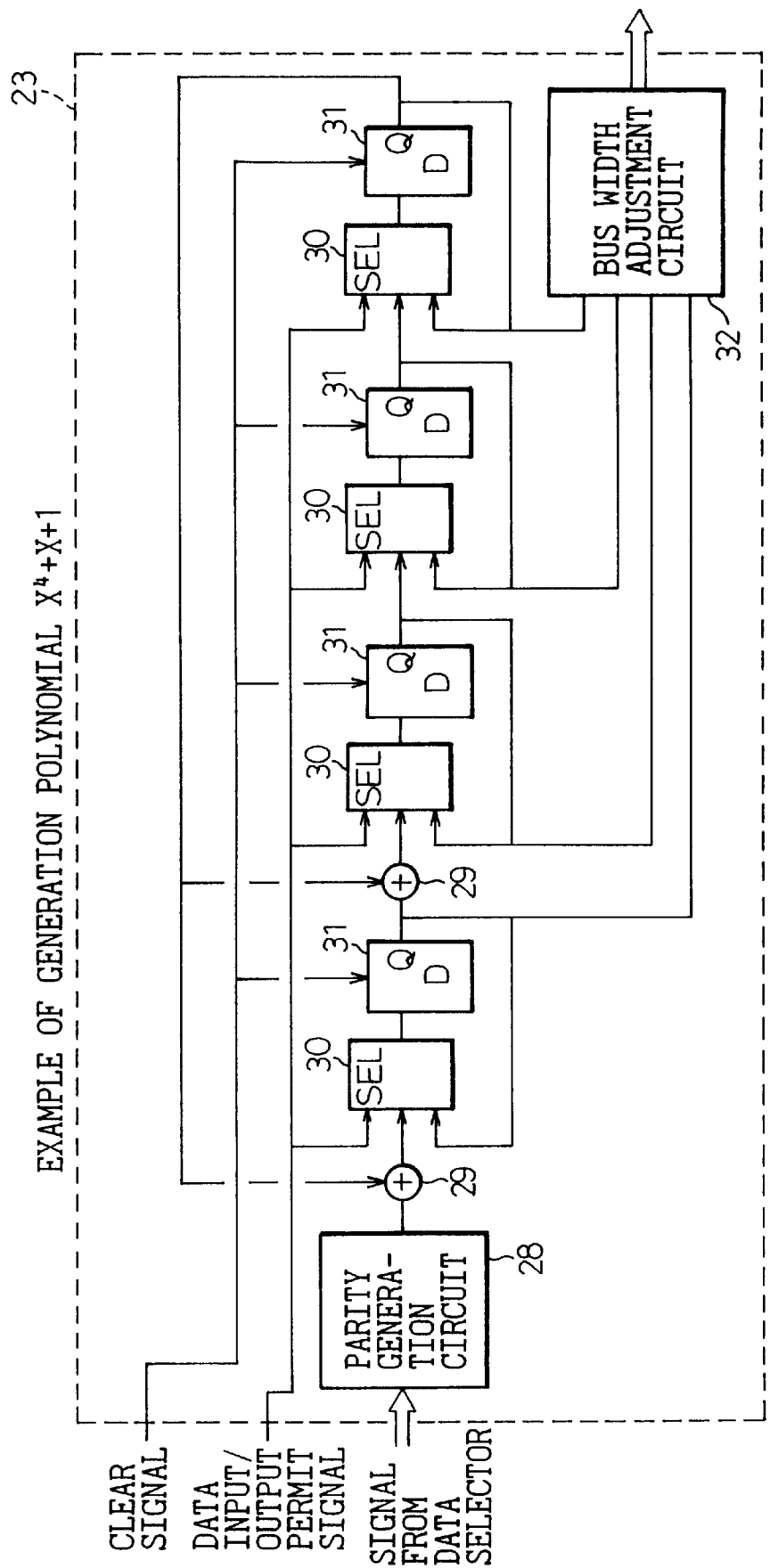
Fig.31 EXAMPLE OF GENERATION POLYNOMIAL $X^4+X+1$

EXAMPLE OF GENERATION POLYNOMIAL $X^4+X+1$

EXAMPLE OF CHECKSUM CALCULATION BY 16-BIT WIDTH

METHOD AND APPARATUS FOR VERIFYING DATA TRANSFER IN DATA PROCESSOR EQUIPPED WITH EXTERNAL RECORDING UNIT

BACKGROUND OF THE INVENTION

1. Field of the Invention

This invention relates to a method and an apparatus for verifying a data transfer in a data processor equipped with an external recording unit. More particularly, in a data processor such as a computer equipped with an external data recording unit having an ATA interface such as a hard disk or an opto-magnetic disk, for controlling the external recording unit, the present invention relates to a method and an apparatus for verifying data transfer between a main board of the data processor and the external recording unit.

2. Description of the Related Art

Data transfer between an external recording unit for data used by a computer and a data processor is generally executed in accordance with a specific transfer procedure. An SCSI (Small Computer System Interface) or an ATA (Advanced Technology Attachment) interface is generally used as this transfer procedure.

Since the SCSI interface has high versatility and is easy to use, it has gained a wide application in auxiliary storage devices such as a CD-ROM, an MO, etc, and image input devices such as an image scanner, besides a hard disk. On the other hand, because the cost of the ATA interface is lower than the SCSI interface, its application to the hard disks has been examined in recent years.

A data processor equipped with an external recording unit using the ATA interface does not have means for verifying the correctness of the data in the data transfer. The SCSI interface includes a parity signal line in addition to a data signal line and a control signal line, for example, and can verify the correctness of the data. Though the ATA interface has the data signal line and the control signal line, it does not have the parity signal line for verifying the correctness of the data.

As a result, the danger of an occurrence of trouble if the data is not correctly transferred has increased in data processors equipped with external recording units using the ATA interface with a higher data transfer rate in recent years. Irrespective of such a technical background, a fundamental method has not yet been employed in the data processors equipped with the external recording units using the ATA interface. Accordingly an improvement of reliability of the data transfer in ATA interface has been expected.

SUMMARY OF THE INVENTION

The aim of the present invention is to provide a method and apparatus for verifying transfer data in a data processor equipped with an external recording unit having an ATA interface, which can prevent possible errors in data transfer equivalently to, or more reliably than, a parity check system while being compatible with the conventional ATA interface specification, and can guarantee the data.

A transfer data verification method in the data processing equipped with an external recording unit according to the present invention for accomplishing the object described above is a method of verifying transferred data in a data processor which incorporates a main board having a microprocessor mounted thereto and an external recording unit for storing data, and wherein the data transfer is effected between the main board and the external recording unit through a specific interface, and this method comprises a first stage in which, when the data transfer is effected between the data processor and the external recording unit, a data check code having a one-byte width is calculated on the data processor side by a predetermined calculation formula by regarding this transfer data as serial data; a second stage in which, when the data transfer is effected between the data processor and the external recording unit, a data check code having a one-byte width is calculated on the side of the external recording unit by the same predetermined calculation formula as that of the data processor side on the side of the external recording unit by regarding the transfer data as serial data; a third stage in which, after the data transfer is completely finished, the data check code calculated on the side of the data processor is compared with the data check code calculated on the side of the external recording unit; and a fourth stage in which, when these two data check codes coincide with each other, the data transfer is judged as being effected without error, and when they do not coincide, the data transfer is judged as not being effected normally.

The data transfer verification apparatus in a data processor equipped with an external recording unit according to the present invention for accomplishing the afore-mentioned object is an apparatus for verifying transferred data in a data processor which incorporates a main board having a microprocessor mounted thereto and an external recording unit for storing data, and wherein the data transfer is effected between the main board and the external recording unit through a specific interface, and this apparatus comprises first means which, when the data transfer is effected between the data processor and the external recording unit, calculates a data check code having a one-byte width on the side of the data processor by a predetermined calculation formula by regarding the transfer data as serial data; second means which, when the data transfer is effected between the data processor and the external recording unit, calculates a data check code having a one-byte width on the side of the external recording unit by the same predetermined calculation formula as that on the data processor side by regarding the transfer data as serial data; third means which, after the data transfer is completely finished, compares the data check code calculated on the side of the data processor with the data check code calculated on the side of the external recording unit; and fourth means which judges that the data transfer is effected without error when these two data check codes coincide with each other, and judges that the data transfer is not effected normally when they do not coincide.

The method and the apparatus for verifying the transfer data in the data processor equipped with the external recording unit according to the present invention can prevent errors in the data transfer equivalently to, or more reliably than, the parity check system and can guarantee the data while keeping compatibility with data processors having a specific interface according to the prior art.

BRIEF DESCRIPTION OF THE DRAWINGS

The present invention will be more clearly understood from the description as set forth below with reference to the accompanying drawings, wherein:

FIG. 1 is a table showing the signals handled by each pin of a 50-pin SCSI interface cable according to the prior art;

FIG. 4 is a table showing the signals handled by each pin of a 40-pin ATA interface cable according to the prior art;

FIG. 5 is a table showing an example of the construction of a task file register according to the prior art;

FIG. 6 is a table showing an example of the construction of a status register according to the prior art;

FIG. 7 is a time chart useful for explaining a DMA transfer timing in an ATA interface according to the prior art;

FIG. 8 is a time chart useful for explaining a PIO transfer timing in a PIO interface according to the prior art;

FIGS. 17A to 17C are time charts, each showing a sequence example of DMA transfer in the data processor according to the embodiment shown in FIG. 15;

FIGS. 18A to 18C are time charts, each showing an example of a write command sequence of PIO transfer in the data processor according to the embodiment shown in FIG. 15;

FIGS. 22A to 22C are time charts, each showing a sequence example of DMA transfer in the circuits shown in FIGS. 20 and 21;

FIG. 31 is a circuit diagram showing the construction of a parity check code generation circuit shown in FIG. 15 according to the first embodiment;

DESCRIPTION OF THE PREFERRED EMBODIMENTS

Before describing the preferred embodiments, an explanation will be given on the data transfer method between an external recording unit and a data processor according to the prior art shown in FIGS. 1 to 10.

Figure 2:
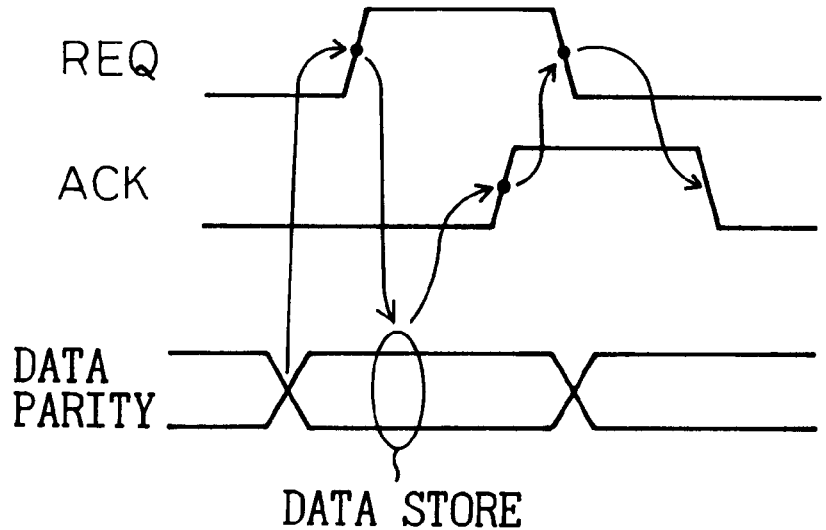
FIG. 2 is a time chart showing a data readout sequence from a conventional external recording unit in a data processor using an SCSI interface.

A SCSI interface generally uses a 50-pin cable, and FIG. 1 shows the names of signals flowing through signal lines corresponding to pin numbers. DBP represented by the pin number 18 in this drawing corresponds to a parity signal line. In the SCSI interface, data transfer is effected by hand-shake between a REQ (request) signal and an ACK (acknowledge) signal. FIG. 2 shows the case where a data processor reads out data from an external recording unit, by way of example. In the data exchange, the external recording unit outputs the data and the parity value on the signal line and then asserts the REQ signal. The data processor then asserts and stores the ACK signal. Thereafter, when detecting the assertion of the ACK signal, the external recording unit negates the REQ signal and waits for the negation of the ACK signal. Detecting the negation of the REQ signal, the data processor stops asserting the ACK signal and negates it.

When the procedure described above is repeated, the data is transferred from the external recording unit to the data processor. At this time, if any data error occurs in either one of the data and the parity value, the data processor receiving the data can detect this error at the timing of the parity check because it executes this parity check.

Figure 3:
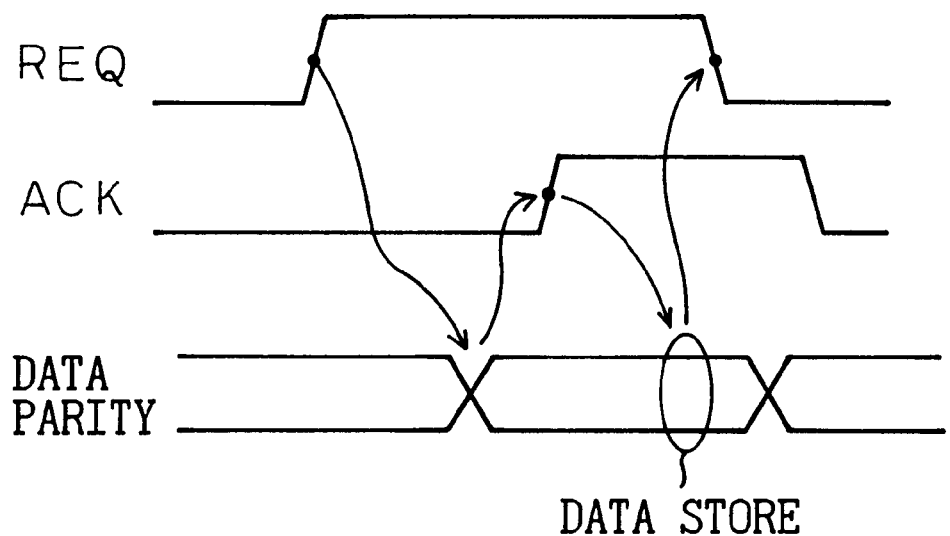
FIG. 3 is a time chart showing a data transfer sequence to a conventional external recording unit in a data processor using an SCSI interface.

Next, FIG. 3 shows the case where the data is transferred from the data processor to the external recording unit. In the data exchange, the external recording unit asserts the REQ signal so that the data is transferred from the data processor. The data processor outputs the data and the parity value on the data signal line and then asserts the ACK signal. The external recording unit stores this signal by negating the REQ signal. Thereafter, the data processor detects the negation of the REQ signal and then negates the ACK signal.

As the procedure described above is repeated, the data is transferred this time from the data processor to the external recording unit. If the data error occurs in either one of the data and the parity value at this time, the external recording unit receiving the data can detect this error at the timing of the parity check because it executes this parity check on the data received.

As described above, the SCSI interface is equipped with a system for detecting an error in the data transfer.

On the other hand, the ATA interface uses a 40-pin cable, and FIG. 4 shows the names of signals flowing through signal lines corresponding to pin numbers. The external recording unit is equipped with registers called "task file registers", and the data exchange is executed in the form in which the data processor makes access to the task file registers of the external recording unit. FIG. 5 shows the construction of the task file register and FIG. 6 shows the construction of a status register as one of the task file registers.

Each register is selected by the combination of the signal lines CS1FX-, CS3FX-, DA2, DA1, DA0 and IOW- (write) and IOR- (read), and a write or read operation is carried out. In the status register, BYS is set when data is written into a command register and is cleared when processing of the command is finished, DRDY represents that the external recording unit is normal, DF represents that the external recording unit is under a write defect state, DRQ represents that the data transfer can be made between the data processor and the external recording unit, CORR represents that a correctable error occurred on the recording medium and ERR represents that the external recording unit caused an error during the execution of the command.

The data transfer method includes two systems, that is, DMA (Direct Memory Access) transfer and PIO (Programmed Input/Output) system. First, the DMA transfer will be explained.

When the data transfer is executed from the external recording unit to the data processor, the external recording unit first sets the DRQ bit of the status register as one of the task file registers of "1" as shown in FIG. 7, and then asserts the DMARQ- signal. This means the transfer request. The data processor confirms assertion of the DMARQ- signal and the transfer request, then asserts the DMACK signal, and asserts the IOR- signal while both of the DMARQ- signal and the DMACK signal are being asserted. After detecting the assertion of the IOR- signal, the external recording unit outputs the data on the data signal line. Next, the data processor negates the IOR- signal and at the same time, stores the data at the timing of negation. The DMARQ- signal is negated at the time at which storage of the transfer of the data requested by the data processor is completely finished, and when storage of the data is all finished, the DMACK- signal is negated.

Next, when the data transfer is effected from the data processor to the external recording unit, the external recording unit first sets the DRQ bit of the status register as one of the task file registers to "1", and then asserts the DMARQ- signal. This means the transfer request. The data processor confirms assertion of the DMARQ- signal and the transfer request, then asserts the DMACK signal, outputs the data on the data signal line while both of the DMARQ- signal and the DMACK- signal are being asserted, and then asserts the IOW- signal. Detecting this assertion of the IOW- signal, the external recording unit stores the data on the data signal line. The DMARQ- signal is negated at the timing at which storage of the transfer of the data required by the data processor is completely finished, and when storage of the data is completely finished, the DMACK- signal is negated.

Next, the PIO transfer will be explained with reference to FIG. 8. When the data is transferred from the external recording unit to the data processor, the external recording unit first sets the DRQ bit of the status register as one of the task file registers to "1". This means the transfer request. When the data processor confirms this register and the transfer request, it asserts the -IOR signal. Detecting this assertion of the IOR- signal, the external recording unit outputs the data to the data signal line. Next, the data processor negates the IOR- signal and at the same time, stores the data at the negation timing. This transfer procedure is repeated in units of one block comprising one or a plurality of sectors as the unit. The DRQ bit is reset whenever the transfer of one block is completed, and is set again before the transfer of the next block.

When the data is transferred from the data processor to the external recording unit, the external recording unit first sets the DRQ bit of the status register as one of the task file registers to "1". This means the transfer request. The data processor confirms this register and the transfer request, outputs the data to the data signal line and at the same time, asserts the -IOW signal. The external recording unit stores the data at the assert timing of the -IOW signal. This transfer procedure is repeated in the unit of one block comprising one or a plurality of sectors as a unit in the same way as in the case of the data transfer from the external recording unit to the data processor. The DRQ bit is reset whenever the transfer of one block is completed, and is set again before the transfer of the next block.

In the data transfer of this ATA interface, the data error cannot be detected even if such a data error occurs during the transfer because the parity signal line is not used.

Figure 9:
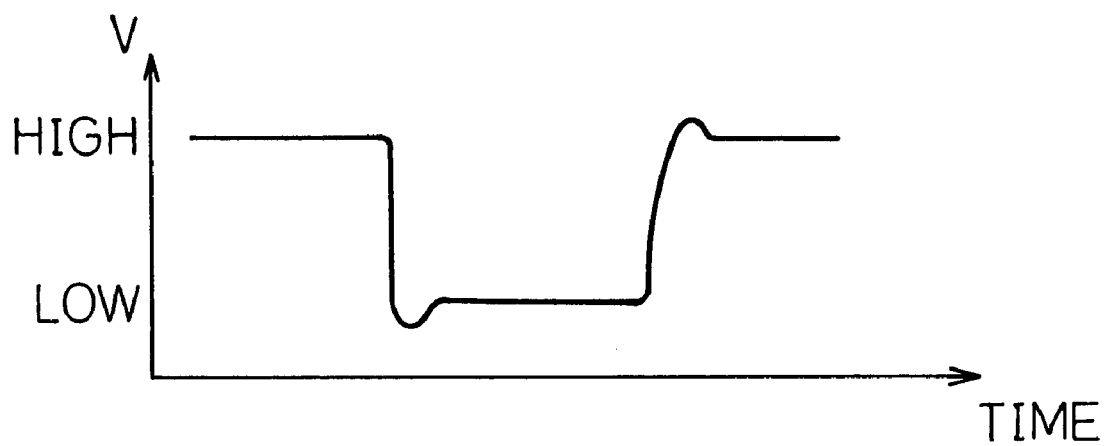
FIG. 9 is a waveform diagram showing a normal change when a signal changes from a high level to a low level.
Figure 10:
FIG. 10 is a waveform diagram showing the state where a ringing noise occurs at the time of a change of a signal from a high level to a low level.

Recently, the danger of the trouble in that the data is not correctly transferred has become higher in the data transfer of the ATA interface with a higher rate of the data transfer. For example, there is the possibility that the data is broken due to the ringing noise of the -IOW or -IOR signal used for reading and writing the data. The term "ringing noise" means the phenomenon in which the signal level fluctuates before it settles during switching of the signal level from the high level to the low or vice versa. FIG. 9 shows the normal signal change and FIG. 10 shows the signal change when the ringing noise occurs. If this ringing noise occurs in the control signal, the data error is likely to occur. In other words, there is the possibility that the external recording unit recognizes two strobes due to the influences of the ringing noise of the -IOW signal.

In FIG. 10, for example, when the external recording unit detects rebound of the -IOW signal, it detects the assert timing of the -IOW signal twice. Therefore, the data transfer which should be originally the one-word data transfer becomes the data transfer of two words. Moreover, the data on the data signal line is transferred twice. As a result, the external recording unit stores the same data twice.

There is also the possibility that -IOR, which has no meaning in practice, is recognized by the external recording unit side due to the influences of the ringing noise of the -IOR signal. When the external recording unit detects the rebound of the -IOR signal, it detects the assert timing of -IOR twice, for example. Therefore, after the original one-word data is outputted to the data signal line, the data of the second word is immediately outputted to the data signal line. At this time, the external recording unit executes the transfer of the data of two words at the timing of the transfer request of one word from the data processor. As a result, the data processor receives the data while skipping the data of one word.

To prevent the error of the data transfer on the ATA interface, means for providing the parity signal, etc, has been considered for the ATA interface.

When the parity signal is provided in order to prevent the data transfer error on the ATA interface, however, new signal lines must be increased physically, so that the cost becomes higher and the merit of the ATA interface is spoiled.

Moreover, even though the parity check function is provided to the ATA interface, the data error cannot be detected in the case described above. For, when the external recording unit stores the data twice, the parity value is stored twice, too, in the same way, and the parity check function cannot detect this double storage. This also holds true of the case where the data processor stores the data by skipping one word. Because the parity value is stored while one parity value is skipped, this skip cannot be detected by the parity check function.

In such two cases, the check of correctness by the parity does not function, either. Nonetheless, no fundamental measures have been taken to improve reliability of the data transfer in the data interface irrespective of the situation described above.

Therefore, the concrete embodiments of the present invention for solving these problems will be explained in detail with reference to the accompanying drawings.

Figure 11A:
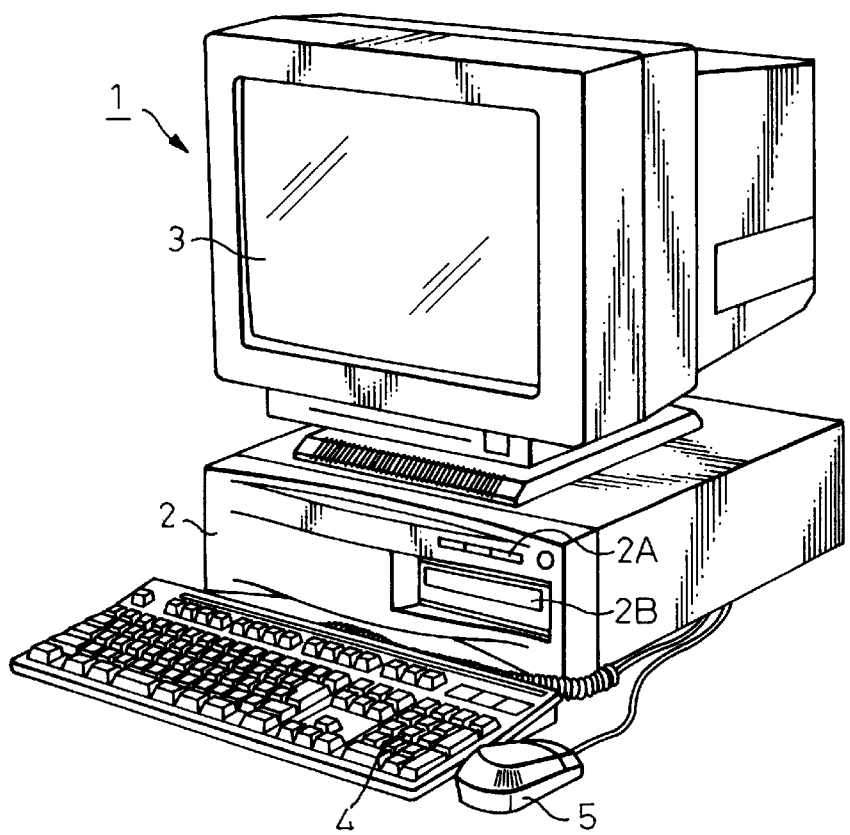
FIG. 11A is a perspective view showing the construction of a desk-top personal computer as an example of data processors to which the present invention is applied.

FIG. 11A depicts a desk-top type personal computer 1 as an example of the data processor equipped with the external recording unit having the ATA interface according to the present invention. The computer 1 in this embodiment includes a CRT display 3 mounted onto a computer main body 2, and a keyboard 4 and a mouse 5 as input devices are connected to this computer main body 2. A loading port 2A of a flexible disk and a loading port 2B of a CD-ROM are provided to the front surface of the computer main body 2.

Figure 11B:
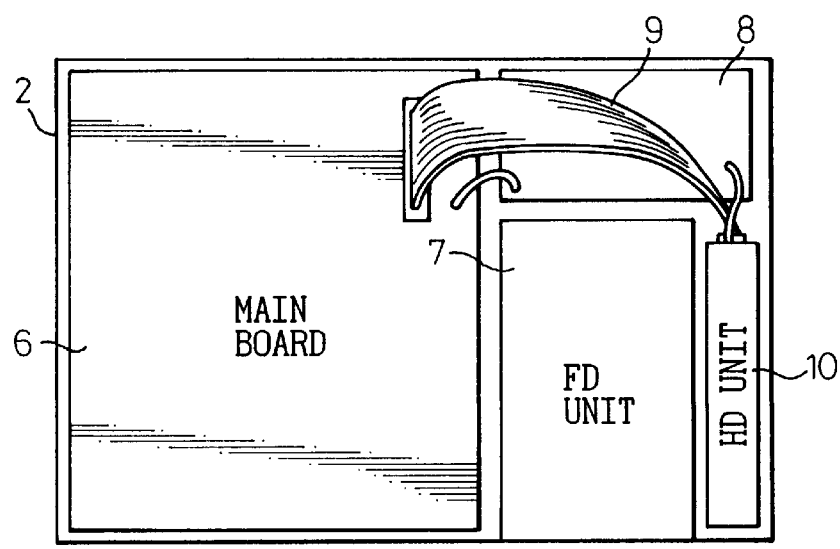
FIG. 11B is a plan view showing the construction of the computer main body shown in FIG. 11A and also showing the state where a cover is removed.

FIG. 11B shows the internal construction of the computer main body 2 shown in FIG. 11A. A main body 6 having mounted thereto a control circuit for controlling the computer 1, a flexible disk (FD) unit 7 and a hard disk unit (HD) 10 as the external recording unit for the data, and a power source circuit 8, are disposed inside the computer main body 2. The main board 6 and the hard disk unit 10 are connected by an ATA interface cable 9. By the way, the connection between the main board 6 and the flexible disk unit 7 is omitted from the drawing because this embodiment is not directed to explain the flexible disk unit 7.

Figure 12A:
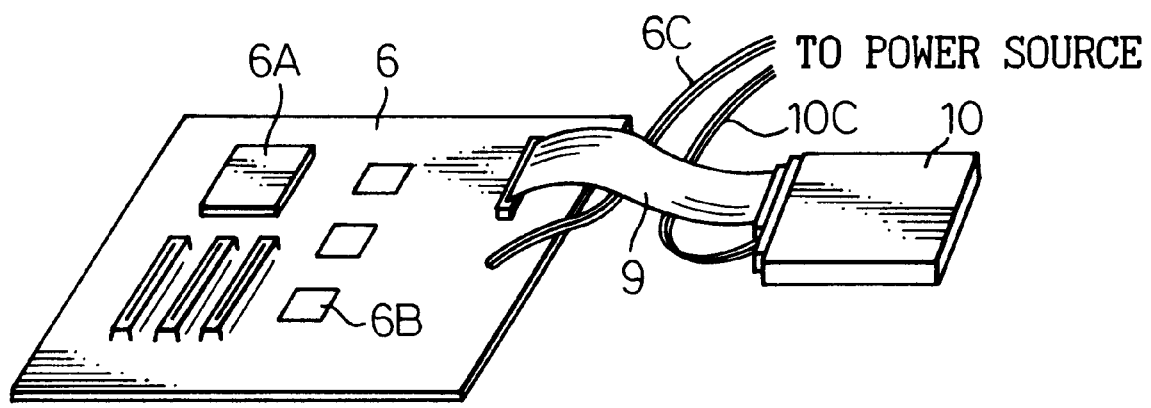
FIG. 12A is a perspective view showing the connection between a hard disk unit and a main board shown in FIG. 11B.
Figure 12B:
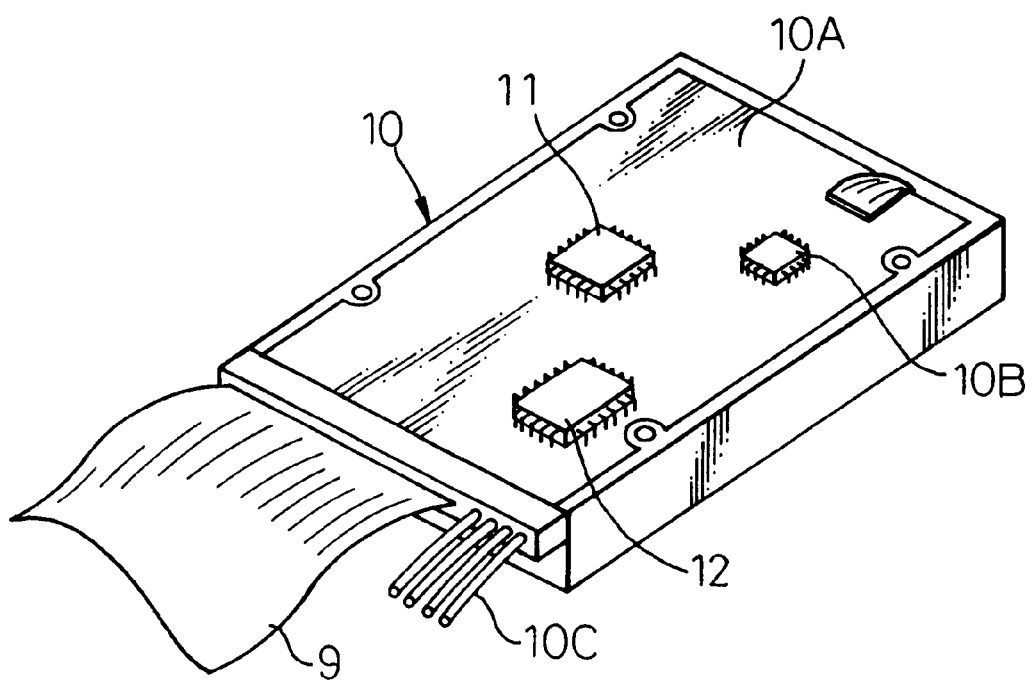
FIG. 12B is a perspective view when the hard disk unit shown in FIG. 12A is viewed from the back side.

FIG. 12A shows the main board 6 and the hard disk unit 10 connected by the ATA interface cable 9 shown in FIG. 11B as they are taken out. FIG. 12B shows the hard disk unit 10 in FIG. 12A when viewed from the back. An MPU 6A and other circuit components 6B are mounted onto the main board 6 and are connected to a power source by a power cable 6C. A circuit substrate 10A is disposed on the rear side of the hard disk unit 10, and an MPU 11, an ATA interface control circuit 12 and other circuit components 10B are mounted on this circuit board 10A. These components are mounted in an LSI form. Reference numeral 10C denotes a power cable of the hard disk unit 10.

Figure 13:
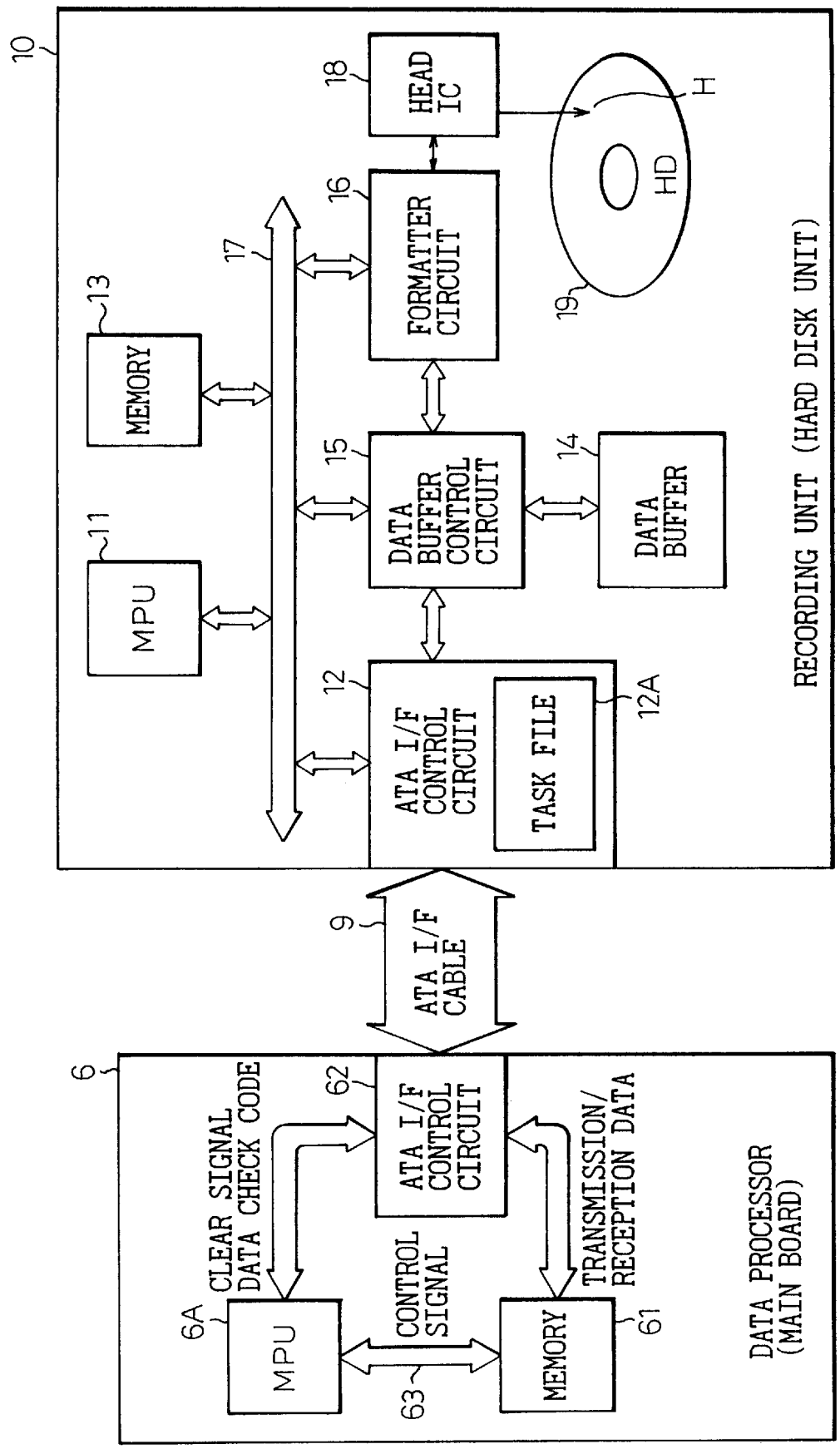
FIG. 13 is a block circuit diagram showing the construction of a main board and a hard disk unit connected by an ATA interface cable inside the computer main body shown in FIG. 11A.

FIG. 13 shows the internal circuit construction of the main board 6 and the hard disk unit 10 connected by the ATA interface cable inside the computer main body 2 shown in FIG. 11A.

Besides the MPU 6 explained with reference to FIG. 12A, a memory 61 and an ATA interface control circuit 62 are disposed on the main board 6 side and are connected with one another by a bus 63. A control signal flows through the bus 63 between the MPU 6A and the memory 61, and a clear signal and the later-appearing data check code, etc, flow through the bus 63 between the MPU 6A and the ATA interface control circuit 62. Transfer data and reception data flow through the bus 63 between the memory 61 and the ATA interface control circuit 62, and the ATA interface control circuit 62 exchanges the data with the hard disk 10 through the ATA interface cable 9.

On the other hand, a memory 13, a data buffer control circuit 15 for controlling a data buffer 14, a formatter circuit 16, a bus 17 for connecting these circuits to one another, a head IC 18 for writing the data into a hard disk 19 through a head H and reading out the data from the hard disk 19 through the head H, etc, are disposed inside the hard disk unit 10 besides the MPU 11 and the ATA interface control circuit 12 described above.

Figure 14:
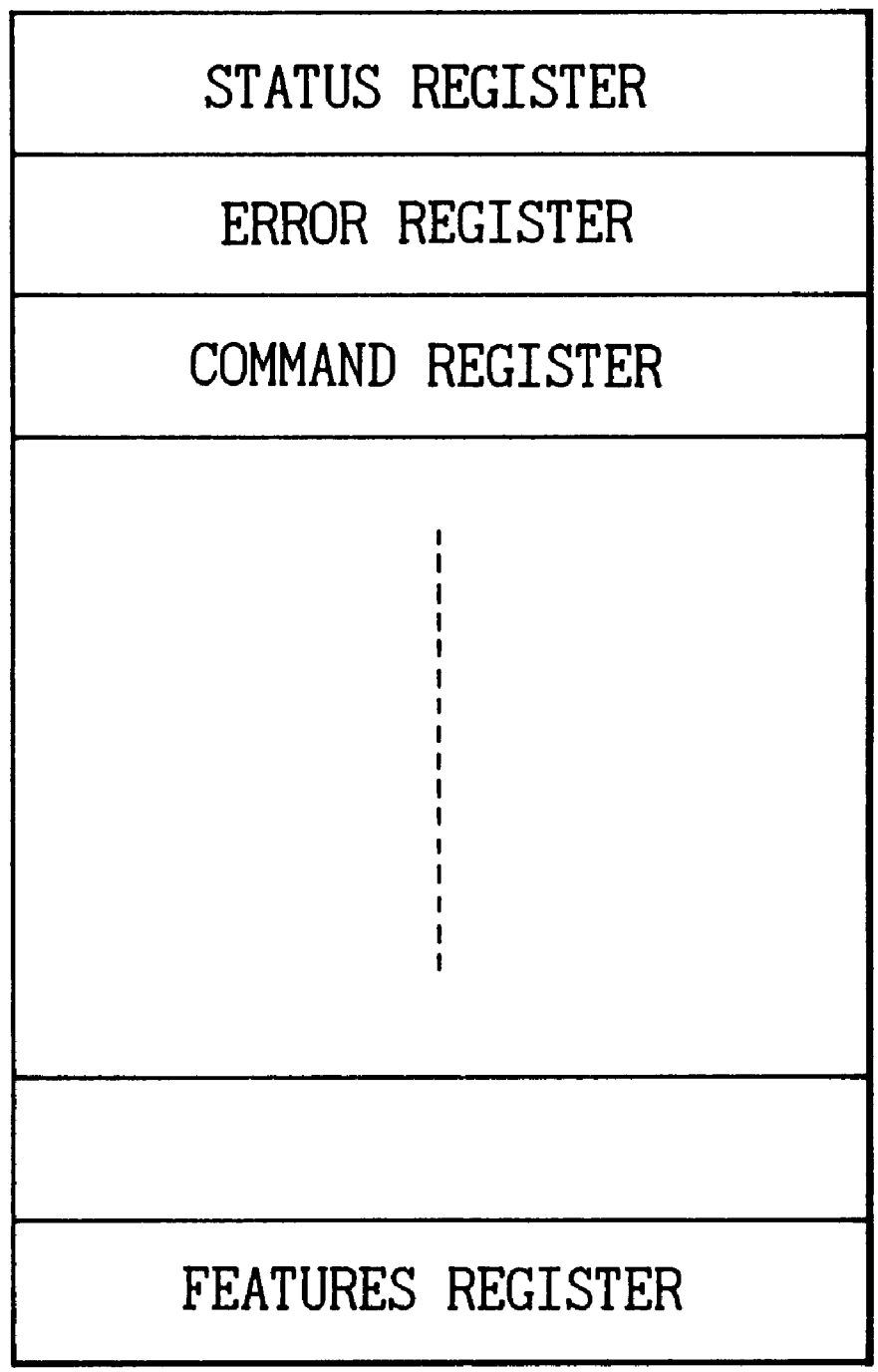
FIG. 14 shows an example of the construction of a task file shown in FIG. 13.

The ATA interface control circuit 12 includes a task file 12A, and FIG. 14 shows in detail this task file 12A. The task file 12A includes a status register, an error register, a command register, a features register, and so forth.

Figure 15:
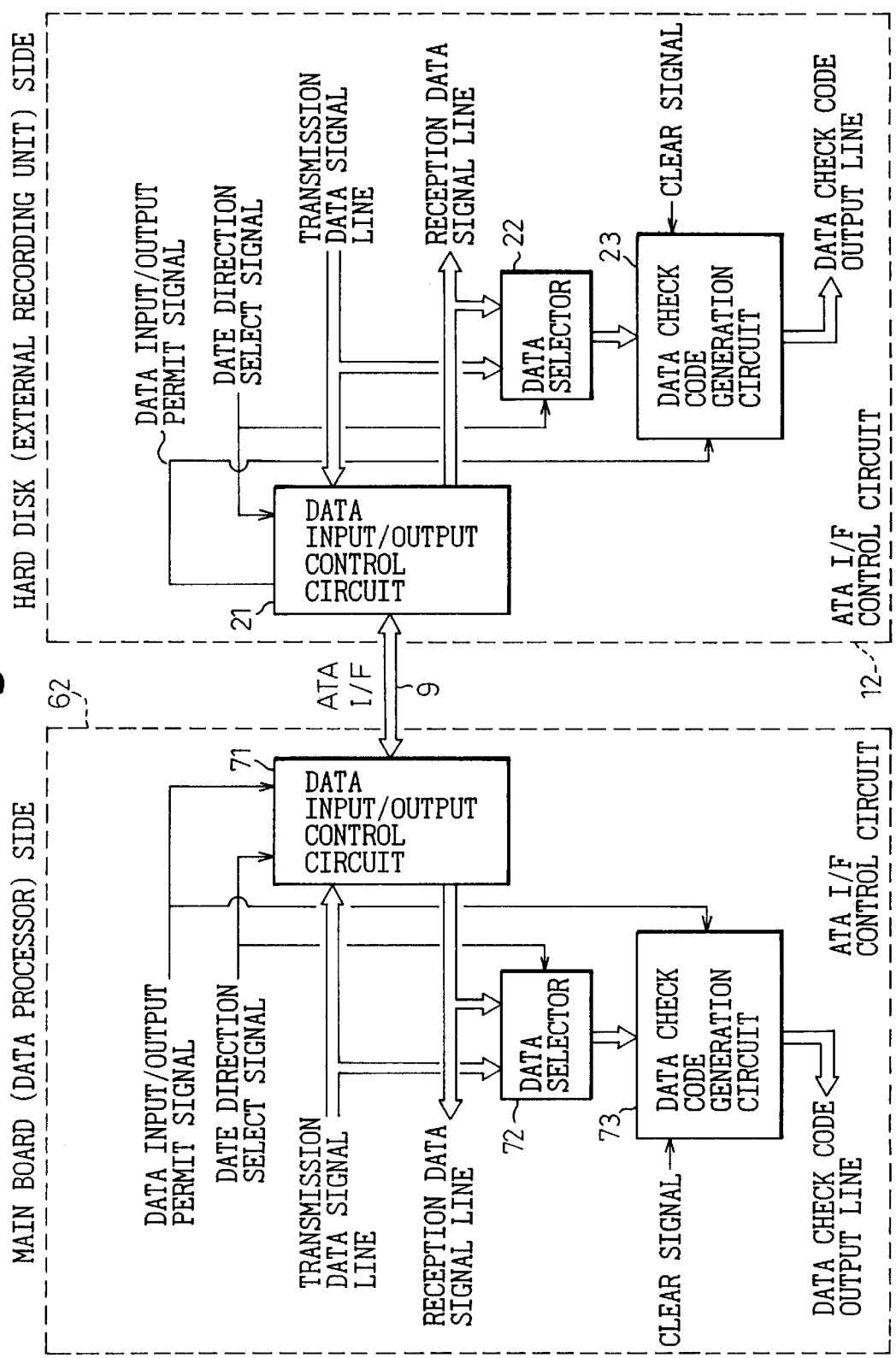
FIG. 15 is an explanatory view showing the circuit construction inside ATA interface control circuits on the data processor side and on the external recording unit side shown in FIG. 13, and also showing the flow of signals flowing through the circuits.

FIG. 15 shows the circuit construction in the ATA interface control circuits 12 and 62 on the side of the hard disk unit 10 (hereinafter called the "external recording unit 10") and on the main board 6 side (hereinafter called the "data processor 6") explained with reference to FIG. 13, and the signals flowing through the circuits. The ATA interface control circuit 12 on the side of the external recording unit 10 includes a data input/output circuit 21 connected to the ATA interface cable 9, a data selector 22 and a data check code generation circuit 23. The ATA interface control circuit 62 on the data processor 6 side includes similarly a data input/output circuit 71 connected to the ATA interface cable 9, a data selector 72 and a data check code generation circuit 73.

Figure 16:
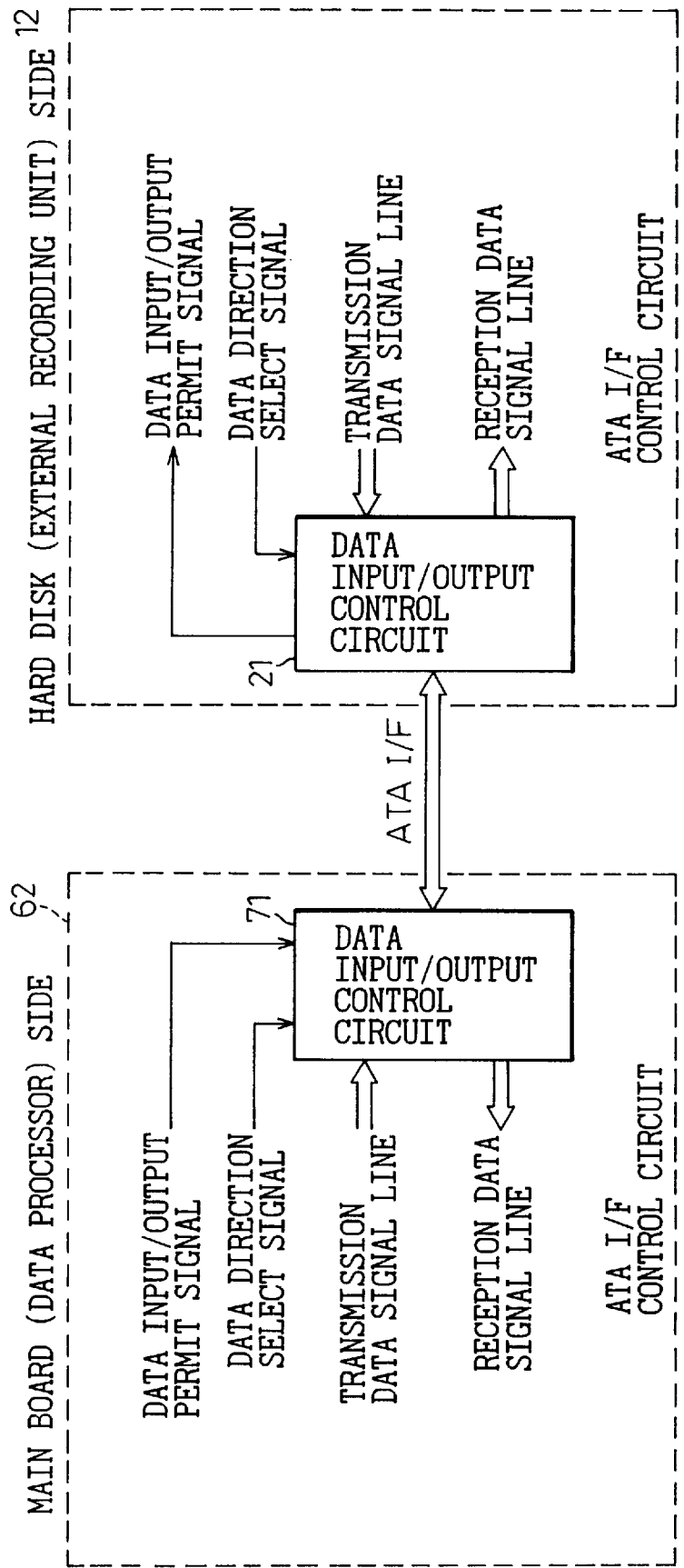
FIG. 16 is an explanatory view showing the circuit construction inside ATA interface control circuits on the data processor side and on the external recording unit side in the conventional data processor, and also showing the flow of signals flowing through the circuits.

In the data processor according to the prior art, in contrast, only the data input/output circuits 21 and 71 are disposed in the ATA interface control circuits 12 and 62 on the main board 6 side and on the hard disk 10 side, respectively, as shown in FIG. 16.

In FIG. 15, each of the data input/output control circuits 21 and 71 is a circuit that executes the data transfer on the ATA interface 9 exhibiting an asynchronous operation, and delivers the data inside the data processor 6 or with a sync circuit inside the external recording unit 10. This circuit has been used in the past as shown in FIG. 16.

An input signal to a data input/output control circuit 72 or a data input/output permit signal as an output signal from the data input/output control circuit 71 is the signal which is asserted when the write or read operation on the ATA interface 9 represents the data transfer. When the data processor 6 stores the data, the data input/output permit signal represents that this data is the reception data, and when the data processor 6 transmits the data, this data input/output permit signal decides the timing of transfer of the data to the ATA interface 9.

The external recording unit 10 transfers the data to the data processor 6 or receives the data from the data processor 6 in time with this data input/output permit signal because, IOW- and IOR- as the data control signals are the signals which are always controlled by the data processor 6. A data direction select signal is the one that decides the input/output direction of the data. A transmission data signal line is the one through which the data is sent from inside the external recording unit 10 and the data processor 6 when the data is sent to the ATA interface 9, and a reception data signal line is the one through which the data received from the ATA interface 9 are sent to the external recording unit 10 and the data processor 6, on the contrary. These signals and signal lines are used in the conventional circuit shown in FIG. 16 and the functions of these signals and signal lines are the same as those of the prior art.

Next, the circuits and the signals added afresh in the present invention will be explained. Data selectors 22 and 72 are selector portions for delivering the data to check code generation circuits 23 and 73, and a data direction select signal is inputted. The data selectors 22 and 72 select the data on either one of the transmission data signal line and the reception data signal line to the data check code generation circuits 23 and 73 in accordance with the input/output direction represented by the data direction select signal. When the data direction select signal represents the output direction, the data on the transmission data signal line is delivered to the check code generation circuits 23 and 73 and when the data direction select signal represents the input direction, the data on the reception data signal line is delivered to the check code generation circuits 23 and 73.

A clear signal is the signal for initializing the data check code generation circuits 23 and 73, and this signal is asserted at the time of generation of a command of the ATA interface 9 or before the start of the data transfer or after completion of the transfer of the data block. When this clear signal is asserted, the data check code generation circuits 23 and 73 are initialized, and again starts its operation from negation of the clear signal. A data check code output line represents the output from the data check code generation circuits 23 and 73, and the MPU 6A and 11 read the data check code by using this signal line.

According to the circuit construction shown in FIG. 15, the same data check code can be generated at the time of the data transfer between the data processor 6 and the external recording unit 10 and the MPU 6A or the MPU 11 can read the data check code as explained already with reference to FIG. 13.

As described above, in the present invention, the data check code of the same system is exchanged between the data processor 6 and the external recording unit 10 at the time of the data transfer and consequently, the data processor 6 side or the external recording unit 10 side can insure correctness of the reception data by using the data check code. The data processor 6 can instruct the external recording unit 10 whether or not this exchange of the data check code should be made, by a new command or a new parameter.

The data check code and the commands in the present invention will be hereby explained. A "set features command", for example, is already known as a command that stipulates the operation method of the external recording unit 10 from the data processor 6. This command is the one whose command code is defined by "EF", and stipulates the operation method of the external recording unit 10 in accordance with the value designated to each register of Cylinder, High, Cylinder Low, Sector Number Sector Count, Features, and Drive Head of the task file register. For example, the instruction of permission/inhibition of the cache function of the data, permission/inhibition of a retry operation, setting of a transfer cycle speed, etc, can be conducted.

Here, a new parameter value is defined such as "0×DD2" (hexadecimal notation) as the parameter of the set features command by utilizing a value which is not yet defined, and an instruction can be given to the external recording unit 10 to conduct the operation effectively exhibiting the function of the present invention by the set features command having this parameter set thereto or an instruction can be given to the external recording unit 10 to conduct an operation invalidating the function of the present invention by the set features command set to 0×DE (hexadecimal notation).

It is also possible to know by the command whether or not setting is effective or whether or not the external recording unit 10 supports the functions of the present invention.

For example, a command "identify command" is known in the past, and 512-byte data called "identify information" is sent by this command from the external recording unit 10 to the data processor 6. This identify information is the one that reports the features of the external recording unit 10 such as its data memory capacity, the transfer method it supports, and so forth, to the data processor 6, and the data processor 6 generates the set features command and instructs the transfer method to the external recording unit 10.

A portion which is not yet defined at present exists in this identify information, and this portion is therefore utilized. It will be assumed hereby that since the word 0×71 (hexadecimal notation) address of the identify information is not yet defined at present and this portion is utilized. It will be assumed also that if a value "00" is written to this portion, this external recording unit 10 is regarded as not having the data verify function and if "01" is written, the external recording unit 10 is regarded as having the data verify function by the data check code. In this way, it will be assumed that the 0×71 address represents whether or not the external recording unit 10 supports the function of the present invention.

Further, the word 0×72 address of the identify information is not yet defined, either. Therefore, it will be assumed further that if "00" is written into this portion, it represents that the external recording unit 10 is operating without using the data check function and if "01" is written, the external recording unit 10 is operating by using the data check function designated by the set features command. In this way, it will be assumed that the 0×72 address represents whether or not the external recording unit 10 supports the function of the present invention.

As described above, it is possible on the side of the data processor 6 by using each of the set features and identify commands to designate the operation method of the external recording unit 10 or to know whether the external recording unit 10 has the check function by the data check code or whether or not the check function by the data check code is in operation.

Incidentally, the term "data check code" used hereby means the code for confirming whether or not any error occurs in the data transfer, and the present invention uses either a system which generates a parity for each transfer data and generates CRC data by inputting this parity value into a CRC calculation system, or a system which uses the CRC data obtained by calculation by regarding each transfer data as mere serial data, or a checksum value obtained by adding each transfer data for each one- or two-byte size. Since the following description can be applied to each of these systems, the term "data check code" will be used with the exception of the description of a specific data check code.

The following description considers the case where the present invention is applied to the DMA command. FIGS. 17A to 17C show the data transfer sequence in the DMA command, and the explanation will be hereby given by using the write DMA command. FIG. 17A shows the operation sequence of the data processor 6 shown in FIG. 13. Circle ○ represents the write DMA command generation timing, and a string of rectangles □□□□ represents that the data is being transferred. Triangle Δ at the last position represents readout of the status from the data processor 6 which is effected at completion of the command. FIG. 17B shows a BUSY bit of the status register and FIG. 17C represents a DRQ bit of the status register.

When the data processor 6 generates the command, the data check code generation circuits 23 and 73 of the data processor 6 and the external recording unit 10 shown in FIG. 15 are initialized by the clear signal. Thereafter, the data transfer is started, and the data check code generation circuits 23 and 73 of the data processing unit 6 and the external recording unit 10 start the calculation. After the transfer is completed, the data transferred to the external recording unit 10 is written into the hard disk (recording medium) 19 shown in FIG. 13.

After write is completed, the external recording unit 10 reports the execution result of the command to the data processor 6. When the write operation is normally completed, the external recording unit 10 sets the value calculated by the data check code generation circuit 23 on the side of the external recording unit 10 to the error register, and reports the status to the data processor 6. The data processor 6 reads the status of the external recording unit 10, and when it represents the normal state, the data processor 6 further reads the error register, and confirms whether or not the value of this error register is equal to the value calculated by the data check code inside the data processor 6. If they are equal, the write operation is regarded as being normally completed and if they are not, the write operation is regarded as failure. The above explains the detail of the operation when the present invention is applied to the DMA command.

Next, the operation when the present invention is applied to the read DMA command will be explained.

When the data processor 6 generates the command to the external recording unit 10, the data check code generation block is similarly initialized, and when the data is read out from the external recording unit 10, the data transfer is executed on the ATA interface 9. At this time, the data check code is calculated inside both the external recording unit 10 and the data processor 6. When the data transfer is completed, calculation of the data check code is completed, too. Thereafter, the external recording unit 10 reports the finish status of the command to the data processor 6 but when the status represents the normal state, it sets the data check code to the error register and reports it to the data processor 6.

The data processor 6 reads the status register of the external recording unit and when it confirms the status representing that data readout and data transfer are normally carried out to the last, it reads out the error register and compares it with the data check code calculated by itself. If they are coincident, all the data are regarded as correct and if not, an abnormality is judged to have occurred.

As described above, the error of the transfer data can be detected by using the present invention. The present invention can be applied also to a write sector, a read sector, a write multiple and read multiple as the commands for executing PIO (Programmed Input/Output) transfer. In the case of the command for executing the read operation, however, the data processor 6 needs the procedure for confirming the status register and the error register after the data transfer unlike the conventional command specification.

Figure 19A:
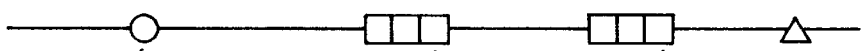
FIGS. 19A to 19C are time charts, each showing an example of a read command sequence of PIO transfer in the data processor according to the embodiment shown in FIG. 15.
Figures 19B, 19C:
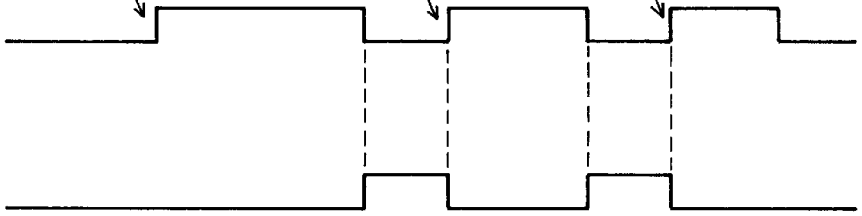

FIGS. 18A to 18C show this procedure. FIG. 18A shows the operation sequence of the data processor, FIG. 18B shows Busy bits of the status register and FIG. 18C shows the DRQ bit of the status register. The sequence shown in FIGS. 18A to 18C is the same as the sequence of the conventional write command. On the other hand, FIG. 19A shows the operation sequence of the data processor, FIG. 19B shows the Busy bit of the status register and FIG. 19C shows the DRQ bit of the status register. It can be understood from the sequence shown in FIGS. 19A to 19C that the check of the status must be made at the finish of the command in the read command.

When the data transfer is executed by employing the construction of the present invention explained with reference to FIGS. 13 and 15, correctness of the reception data can be guaranteed at the time of the data transfer by expanding the simple interface protocol.

Even when the data processor 6 does not cope with this function, too, compatibility with existing systems can be established because the external recording unit 10 can be connected.

Next, the verification method and apparatus of the transfer data according to another embodiment of the present invention will be explained.

Figure 20:
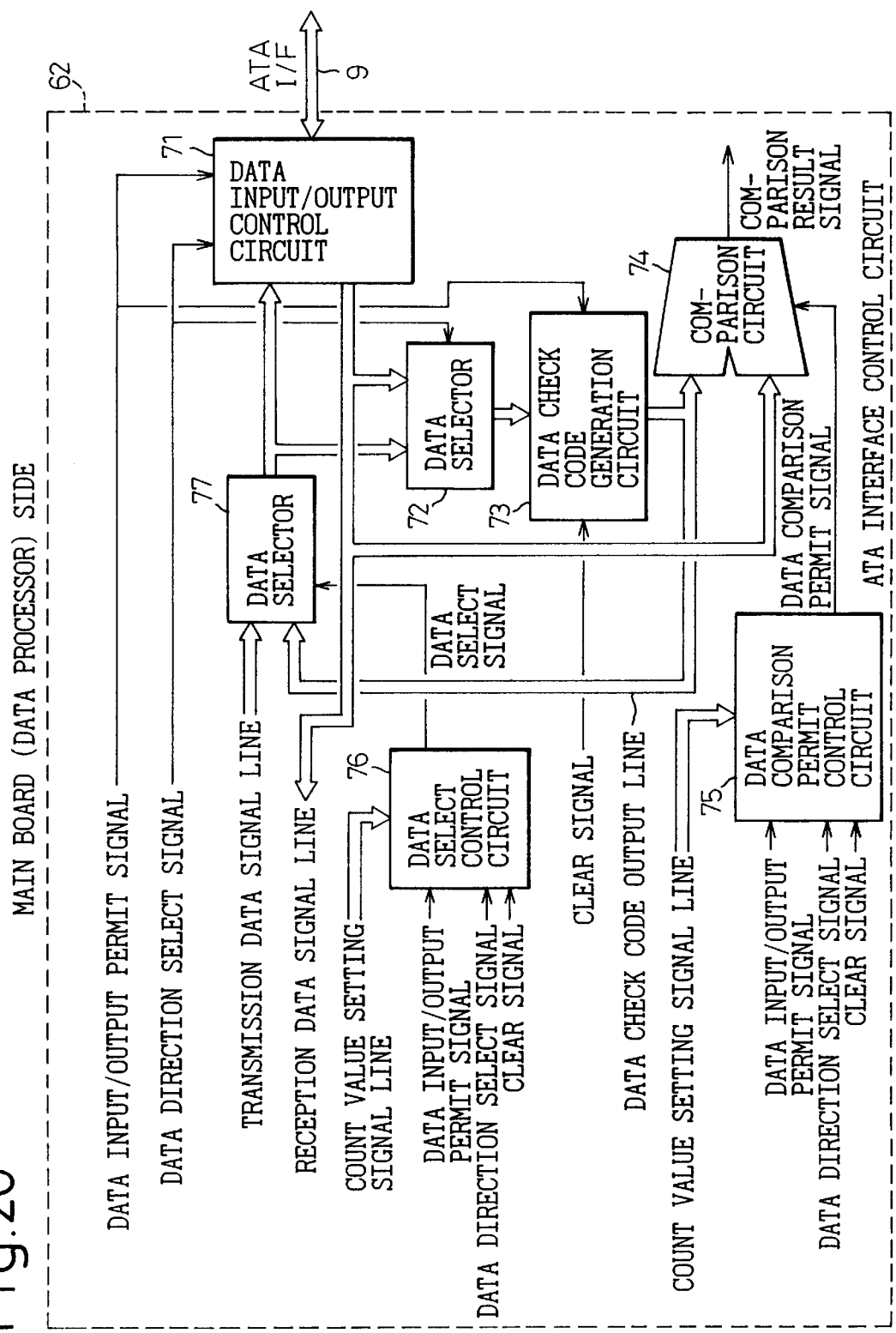
FIG. 20 is an explanatory view showing another circuit construction of an ATA interface control circuit on the data processor side shown in FIG. 13 and also showing signals flowing through this circuit.
Figure 21:
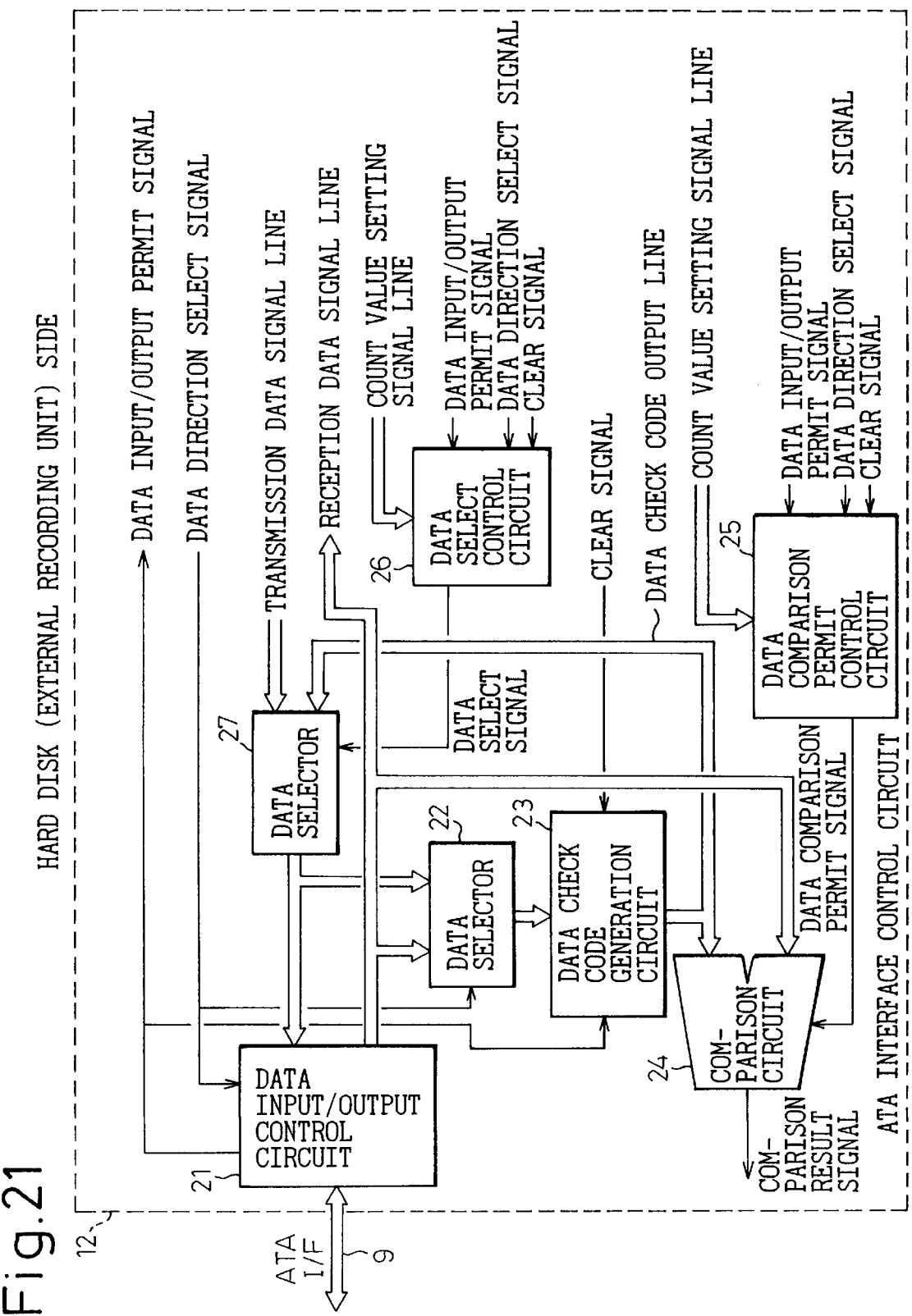
FIG. 21 is an explanatory view showing another circuit construction in the ATA interface control circuit on the external recording unit side shown in FIG. 13 and also showing signals flowing through this circuit.

The construction of the transfer data verification apparatus according to another embodiment is shown in FIGS. 20 and 21. The apparatus shown in FIG. 20 represents the circuit construction on the side of the data processor 6 and the apparatus shown in FIG. 21 represents the circuit construction on the side of the external recording unit 10. Both of them are connected through the ATA interface 9. In the circuits shown in FIGS. 20 and 21, the constructions of the data input/output control circuits 21 and 71, the data selectors 22 and 72, the data check code generation circuits 23 and 73, the data input/output permit signal, the data direction select signal, the transmission data signal line, the reception data signal line, the clear signal and the data check code output line are the same as those shown in FIG. 15.

In addition to the constituent members described above, the transfer data verification apparatus according to another embodiment includes comparison circuits 24 and 74, data comparison permit signal control circuits 25 and 75 and data select control circuits 26 and 27. The comparison circuits 24 and 74 compare the data received by the data processor 6 and the external recording unit 10 with the data check code, and this comparison is controlled by a data comparison permit signal which controls the comparison. Comparison result signals outputted from the comparison circuits 24 and 74 represent the result of comparison, and are asserted when the comparison does not prove successful, for example. The data comparison permit control circuits 25 and 75 calculate the comparison timing, and a data comparison permit signal, a data direction select signal and a clear signal are inputted to these control circuits 25 and 75. Here, whether or not the transfer is completed is confirmed by using the data input/output permit signal representing the data.

A count value setting signal line connected to the data comparison permit control circuits 25 and 75 is the signal line for setting the number of transfer data to be set from the MPUs 6A and 11 to the data comparison permit control circuits 25 and 75. The data select control circuits 26 and 76 generate the data select signal. The data input/output permit signal, the data direction select signal and the clear signal are similarly inputted to these data select control circuits 26 and 76, and a count value setting signal line is connected to them. The data is transferred through the selectors 27 and 77 at the time of transmission of the data. The transfer line is switched at the timing at which the data transfer is completed, and the check code generated by the data check code generation circuits 23 and 73 is transferred through the data selectors 27 and 77.

As described above, in the construction employing the circuit construction shown in FIGS. 20 and 21, a check of correctness of the data is effected on the data receiving side. In the apparatus explained with reference to FIG. 15, on the other hand, confirmation of correctness of the data is always effected on the side of the data processor 6.

In the circuit construction shown in FIGS. 20 and 21, the error check code is transmitted in succession to the data transfer. The explanation will be given when the present invention is applied to the DMA transfer, for example. FIGS. 22A to 22C are time charts showing the sequence of the command when the present invention is applied to the DMA transfer. Namely, FIG. 22A shows the operation sequence of the data processor, FIG. 22B shows the Busy bit of the status register and FIG. 22C shows the DRQ bit of the status register.

A black square ■ in FIG. 22A represents the transfer of the data check code, and other symbols have the same meaning as in the use example shown in FIG. 17. As shown in this drawing, the specification of the DMA command must be changed when the present invention is used. However, the function of the present invention can be utilized without hindering the connection with conventional apparatuses by mutually selecting the transfer system between the data processor 6 and the external recording unit 10.

FIGS. 23A to 28C are time charts showing the sequences when the present invention is applied to the PIO transfer. FIGS. 23A, 24A, 25A, 26A, 27A and 28A show the operation sequences of the data processor, FIGS. 23B, 24B, 25B, 26B, 27B and 28B show the Busy bit of the status register, and FIGS. 23C, 24C, 25C, 26C, 27C and 28C show the DRQ bit of the status register.

Figures 23A, 23B, 23C:
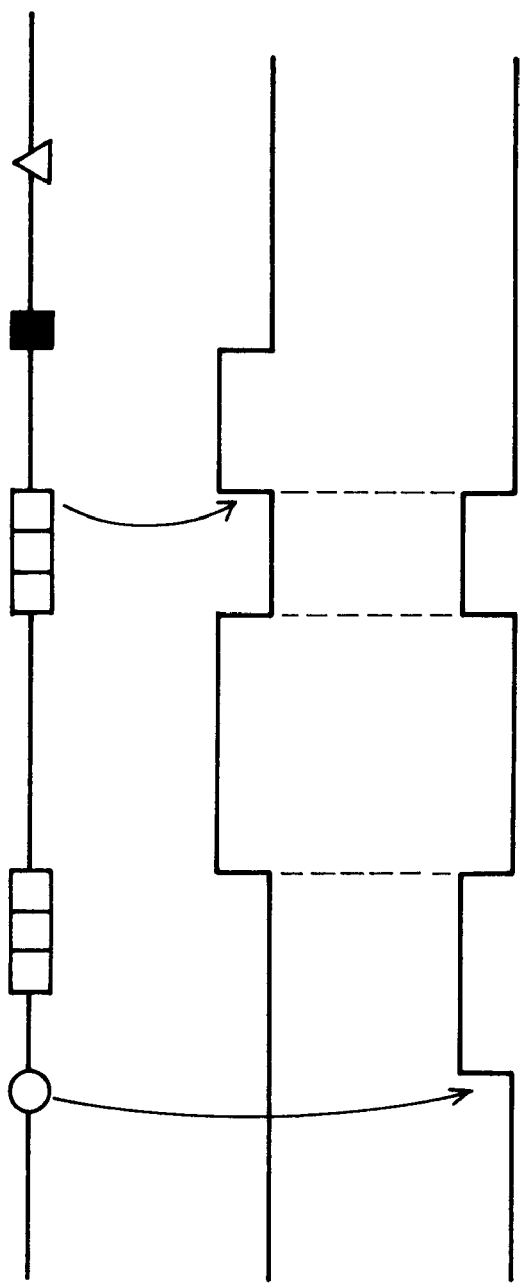
FIGS. 23A to 23C are time charts showing an example of a write command sequence of a PIO transfer in the circuits shown in FIGS. 20 and 21.
Figures 24A, 24B, 24C:
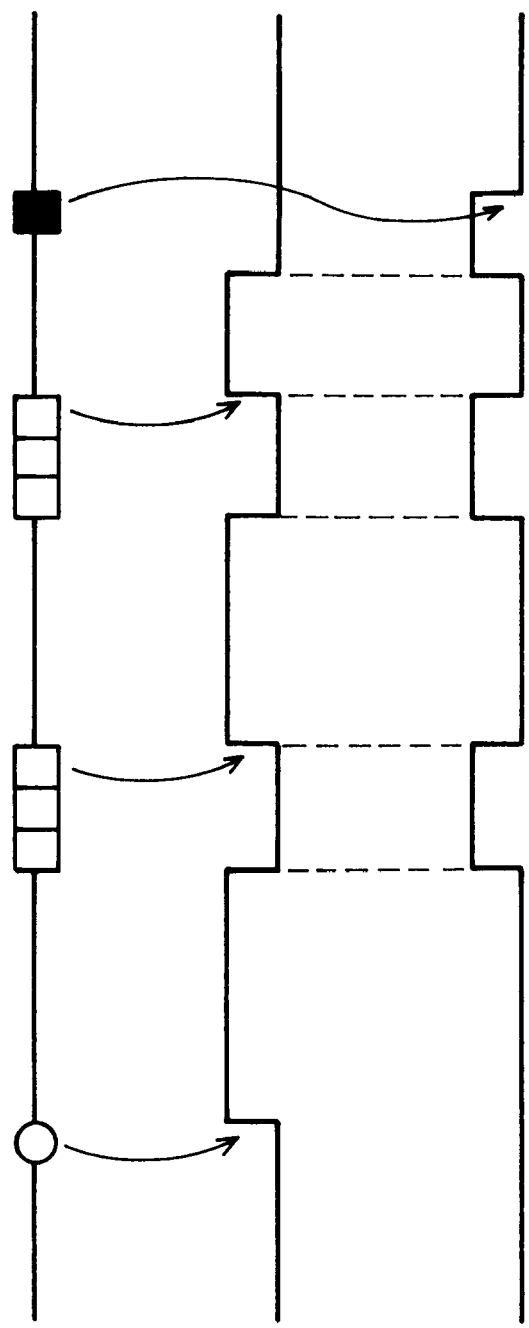
FIGS. 24A to 24C are time charts showing an example of a read command sequence of PIO transfer in the circuits shown in FIGS. 20 and 21.
Figures 25A, 25B, 25C:
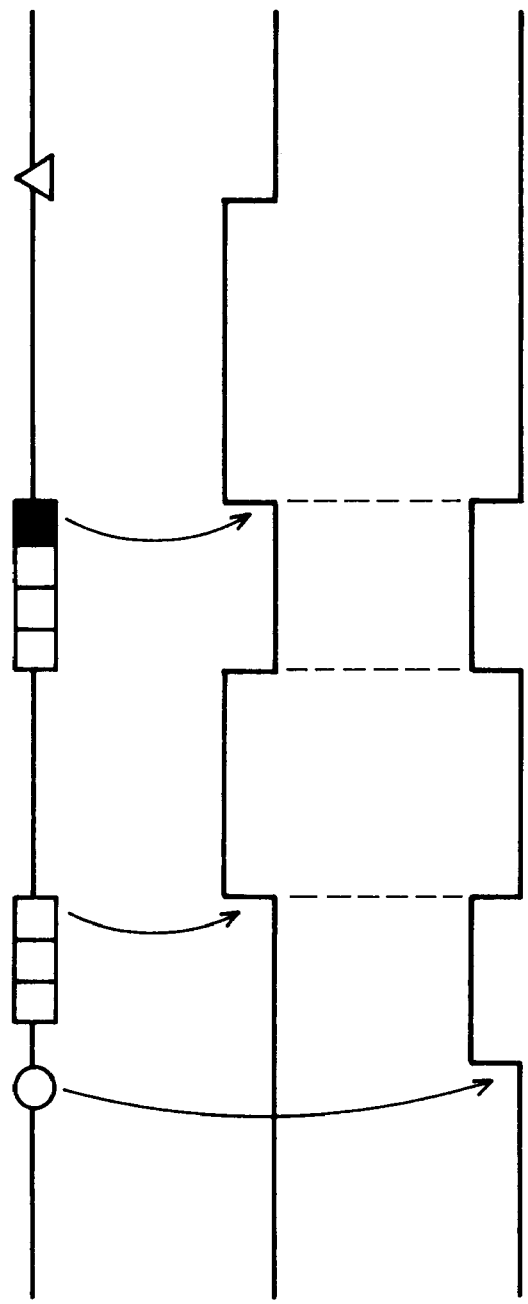
FIGS. 25A to 25C are time charts showing another example of a write command sequence of PIO transfer in the circuits shown in FIGS. 20 and 21.
Figures 26A, 26B, 26C:
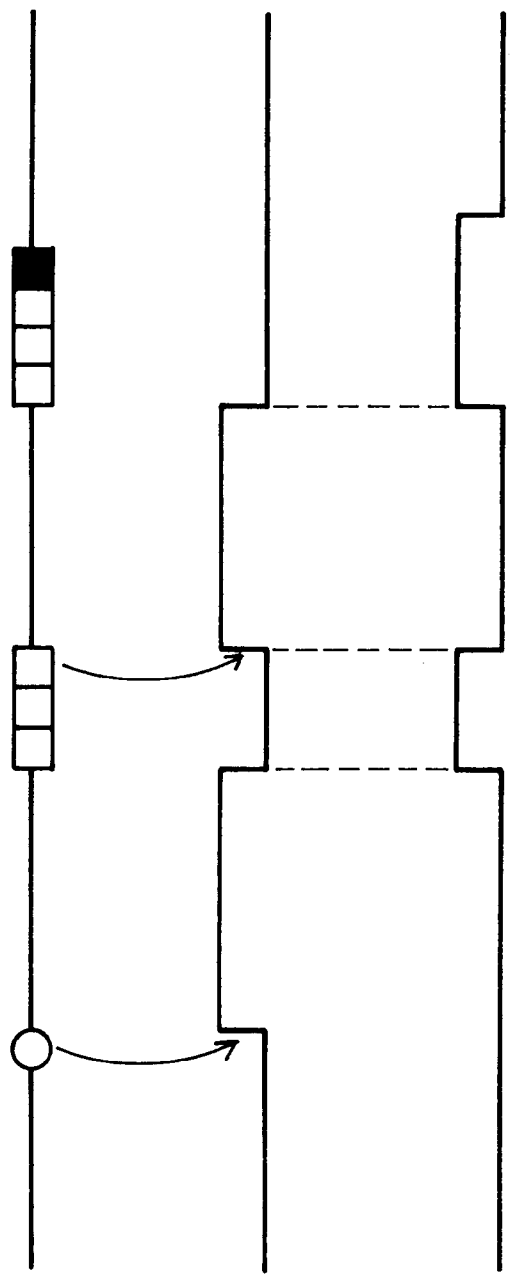
FIGS. 26A to 26C are time charts showing another example of a read command sequence of PIO transfer in the circuits shown in FIGS. 20 and 21.
Figures 27A, 27B, 27C:
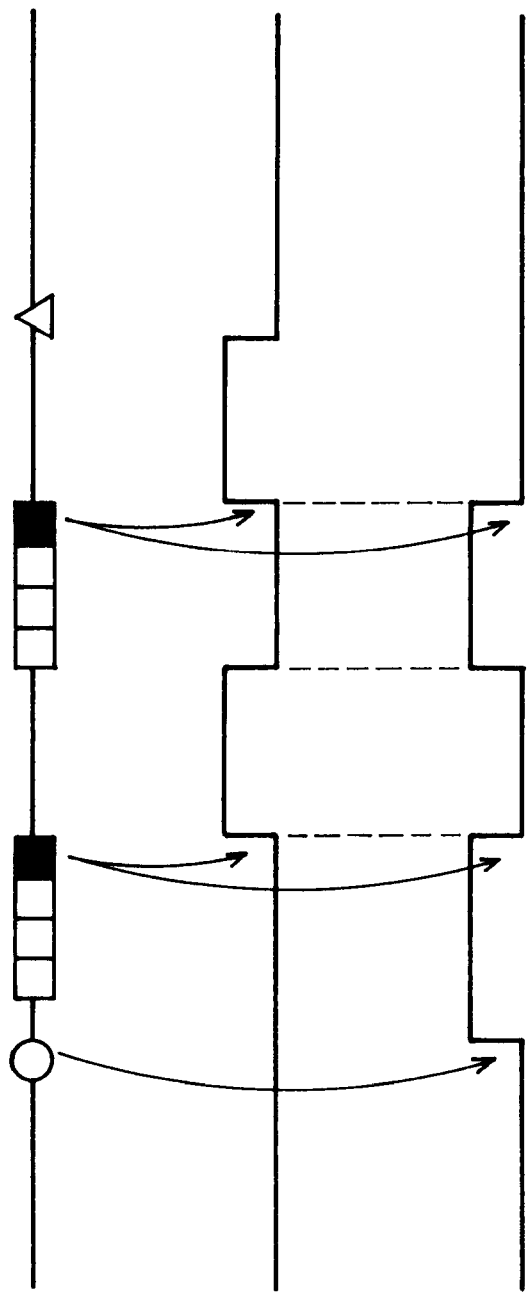
FIGS. 27A to 27C are time charts showing still another example of a write command sequence of PIO transfer in the circuit shown in FIGS. 20 and 21.
Figures 28A, 28B, 28C:
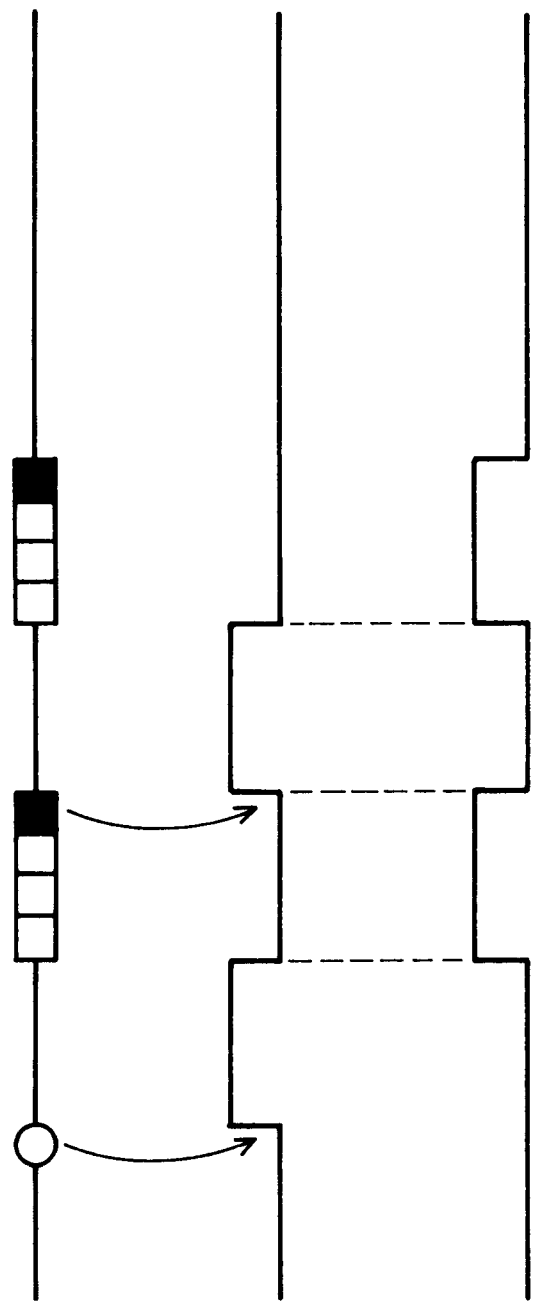
FIGS. 28A to 28C are time charts showing still another example of a read command sequence of PIO transfer in the circuit shown in FIGS. 20 and 21.

Three types of sequences may be possible when the present invention is applied and they are shown in the drawings. FIGS. 23A to 23C show the case when the present invention is applied to the write operation by the PIO system, and the data check code is transferred after the final data transfer. FIGS. 24A to 24C show the case where the present invention is applied to the read operation of the PIO system. Similarly, after the data processor 6 reads out the last data, it receives the data check code.

The sequences shown in FIGS. 25A to 25C and 26A to 26C are different from those shown in FIGS. 23A to 23C and 24A to 24C in that the Busy bit is not once set. FIGS. 27A to 27C and 28A to 28C represent the case where the present invention is applied to the PIO system, and this is the data transfer of the type wherein the data check code is further added to the sector unit.

Figures 29A, 29B, 29C:
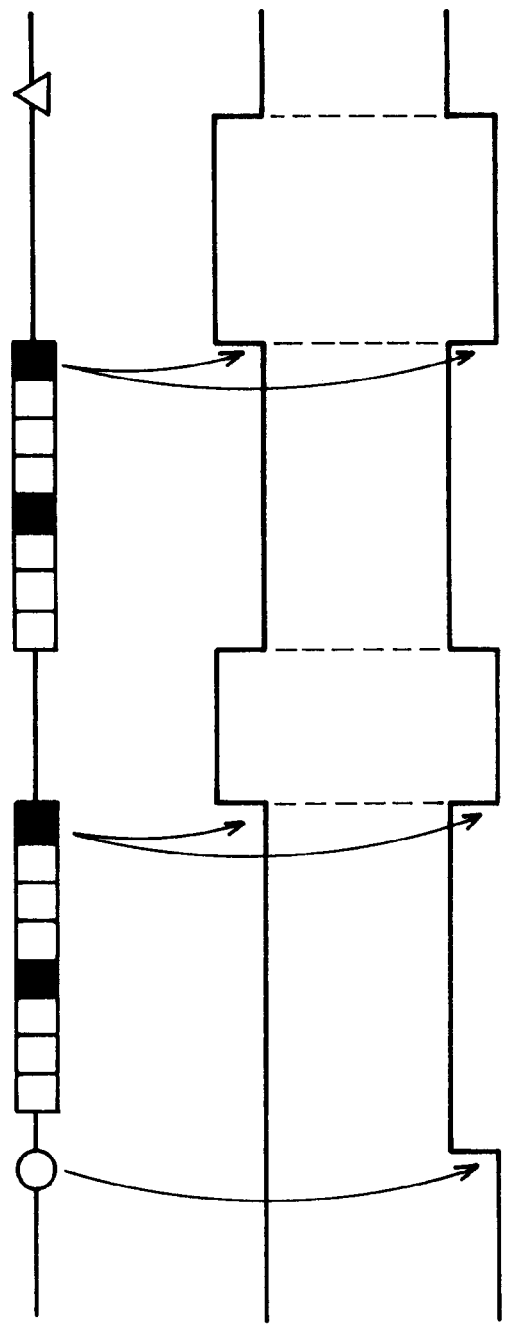
FIGS. 29A to 29C are time charts showing still another example of a write command sequence of PIO transfer in the circuits shown in FIGS. 20 and 21.
Figures 30A, 30B, 30C:
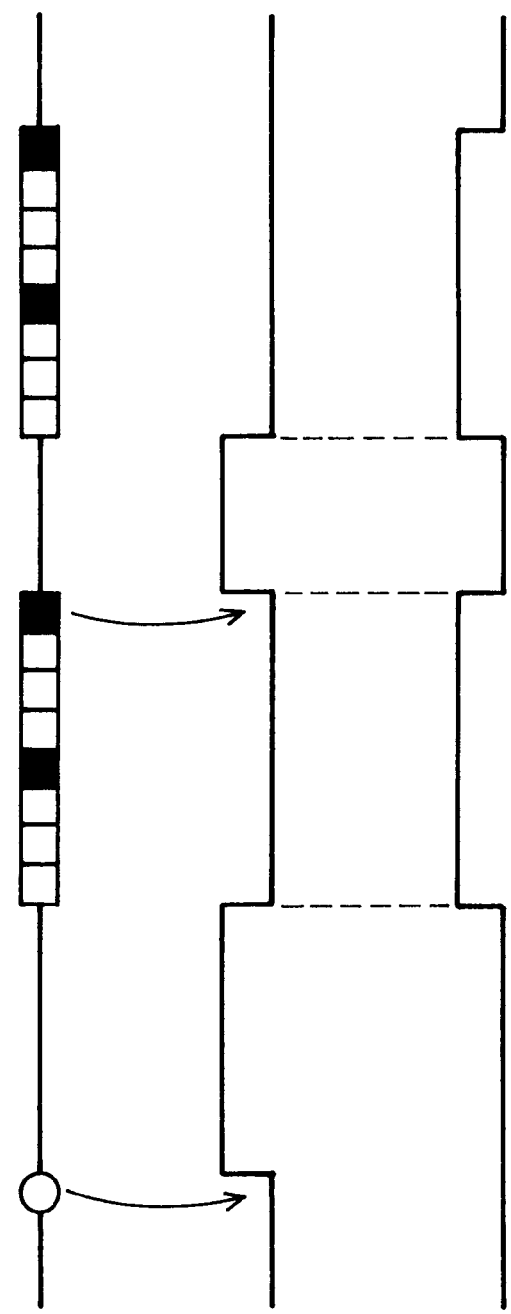
FIGS. 30A to 30C are time charts showing still another example of a read command sequence of PIO transfer in the circuits shown in FIGS. 20 and 21.

FIGS. 29A to 29C and 30A to 30C represent the data transfer of the type wherein the present invention is applied to the PIO system and furthermore, the data check code is added to the sector unit. In this type, the data is transferred by the Write Multiple command and the Read Multiple command. In these drawings, FIGS. 29B and 30B show the Busy bit of the status register and FIGS. 29C and 30C show the DRQ bit of the status register.

The system shown in FIGS. 27A to 30C is characterized in that the data check code is generated in such a manner as to correspond to each sector. The data and the data check code can be as such written into the recording medium (hard disk) at the time of write of the data, and the data and the data check code in the recording medium can be as such sent to the data processor 6 at the time of read by utilizing this feature. In this case, not only verification of data correctness on the ATA interface 9 but also verification of all the lines from the data processor 6 to the recording medium can be made.

Next, the concrete embodiment of the data check code generating circuits 23 and 73 for generating the data check code will be explained. Since the data check code generation circuits 23 and 73 have the same construction, the explanation will be hereby given on only the data check code generation circuit 23 on the side of the hard disk 12 shown in FIGS. 31, 32 and 33.

FIG. 31 shows the first embodiment of a linear shift register circuit for calculating once the parity of the data and then CRC of the parity. Here, $X^4 + X + 1$ is used as a polynomial for generating CRC, but other polynomials can be of course used as the CRC generation polynomial. However, the embodiment explained with reference to FIG. 15 uses CRC of not greater than 8 bits, the embodiment explained with reference to FIGS. 20 and 21 uses the CRC generation polynomial of not greater than 16 bits.

When the data input/output permit signal in FIG. 31 is "assert", the data signal from the data selector 22 explained with reference to FIGS. 15, 20 and 21 is inputted to the parity generation circuit 28 which calculates the parity value of this data signal. The clear signal is inputted to each D latch 31 and sets the output of each D latch to 0. The data input/output permit signal and the clear signal correspond to the data input/output permit signal and to the clear signal explained in FIG. 15, respectively.

Reference numeral 29 denotes an exclusive-OR circuit, which generates an exclusive-OR of the signal from the parity generation circuit 28. Reference numeral 30 denotes a signal select circuit, which selects either the signal from the exclusive-OR circuit 29 and the signal from the output terminal Q of the D latch 31. When the data input/output permit signal represents the input of the data, the signal from the exclusive-OR circuit 29 is inputted to the D latch 31. On the other hand, when the input/output permit signal does not represent the input of the data, the signal from the output terminal Q of the D latch 31 is selected, so that the signal from the output terminal Q of the D latch 31 is again inputted to the D latch 31 and the linear shift register circuit shown in the drawing stops. This is the means for operating the circuit for only the effective data.

Reference numeral 32 denotes a bus width adjusting circuit, which adjusts the output of each D latch 31 to the bus width inside the apparatus. The input to this bus width adjusting circuit 32 is represented by four signal lines in FIG. 31, but the input is practically used as 8 bits or 16 bits.

Figure 32:
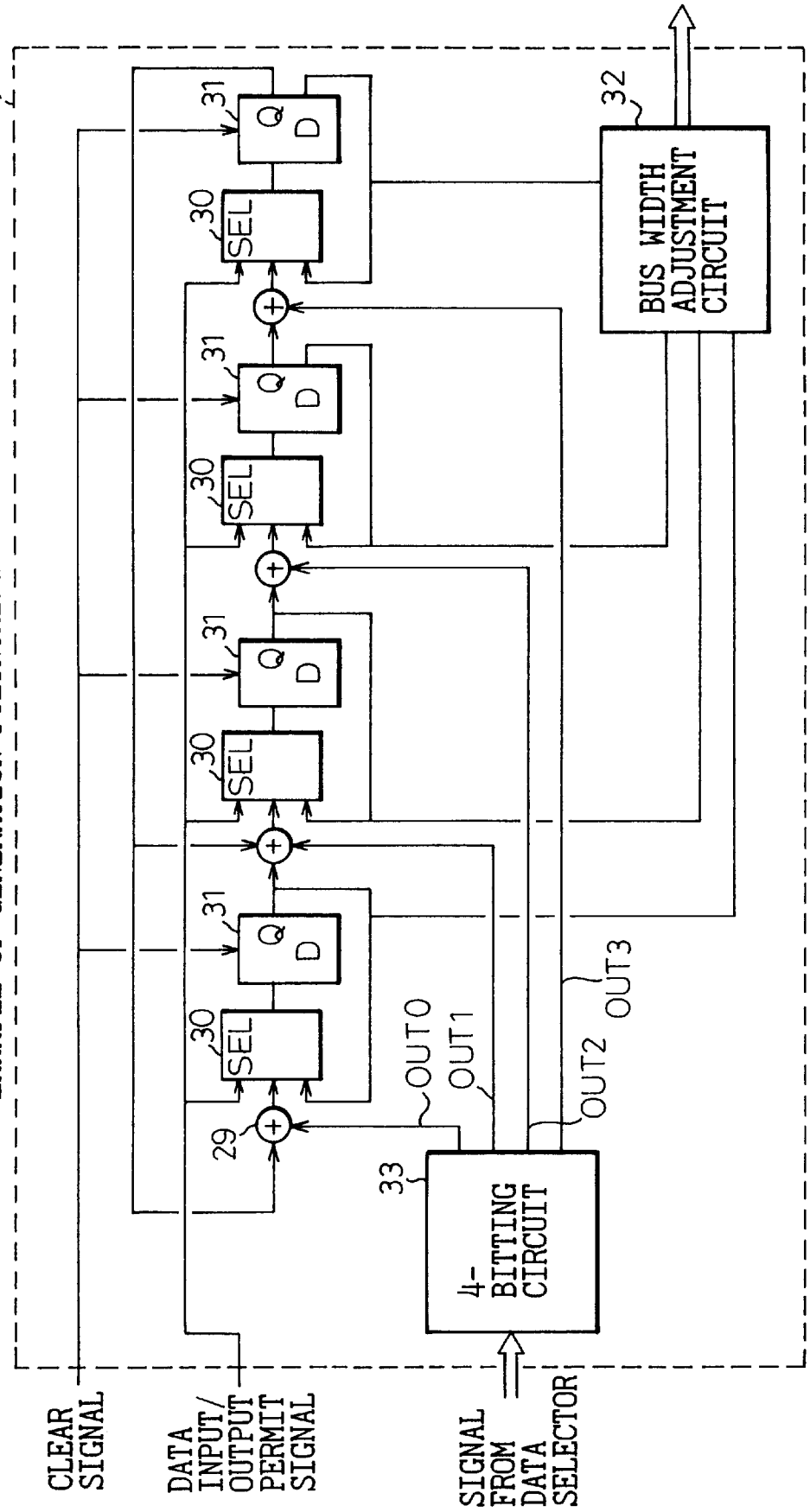
FIG. 32 is a circuit diagram showing the construction of a parity check code generation circuit shown in FIG. 15 according to the second embodiment.

FIG. 32 shows the second embodiment of the linear shift register circuit for generating the data check code. The circuit of this second embodiment uses the circuit having the same function as that of the first embodiment explained with reference to FIG. 31 with the exception of a 4-bitting circuit 33. The 4-bitting circuit 33 changes the data width from 16 bits to 4 bits. When 16 bits are DD15 to DD0 and 4 bits are OUT3 to OUT0, for example, the 4-bitting circuit 33 changes the data width from 16 bits to 4 bits by using the following calculation formula.

OUT3=*DD*14+*DD*13+*DD*12+*DD*11+*DD*9+*DD*7+*DD*6+*DD*3

OUT2=*DD*12+*DD*11+*DD*10+*DD*8+*DD*6+*DD*5+*DD*2+*DD*13

OUT1=*DD*12+*DD*11+*DD*10+*DD*9+*DD*7+*DD*5+*DD*4+*DD*1

OUT0=*DD*15+*DD*14+*DD*13+*DD*12+*DD*10+*DD*8+*DD*7+*DD*4+*DD*0

The output of the 4-bitting circuit 33 is inputted to each exclusive-OR circuit 29 of the linear shift register. This circuit 29 regards the data entering the 4-bitting circuit 33 as the serial data and calculates the result inputted to the shift registers.

Figure 33:
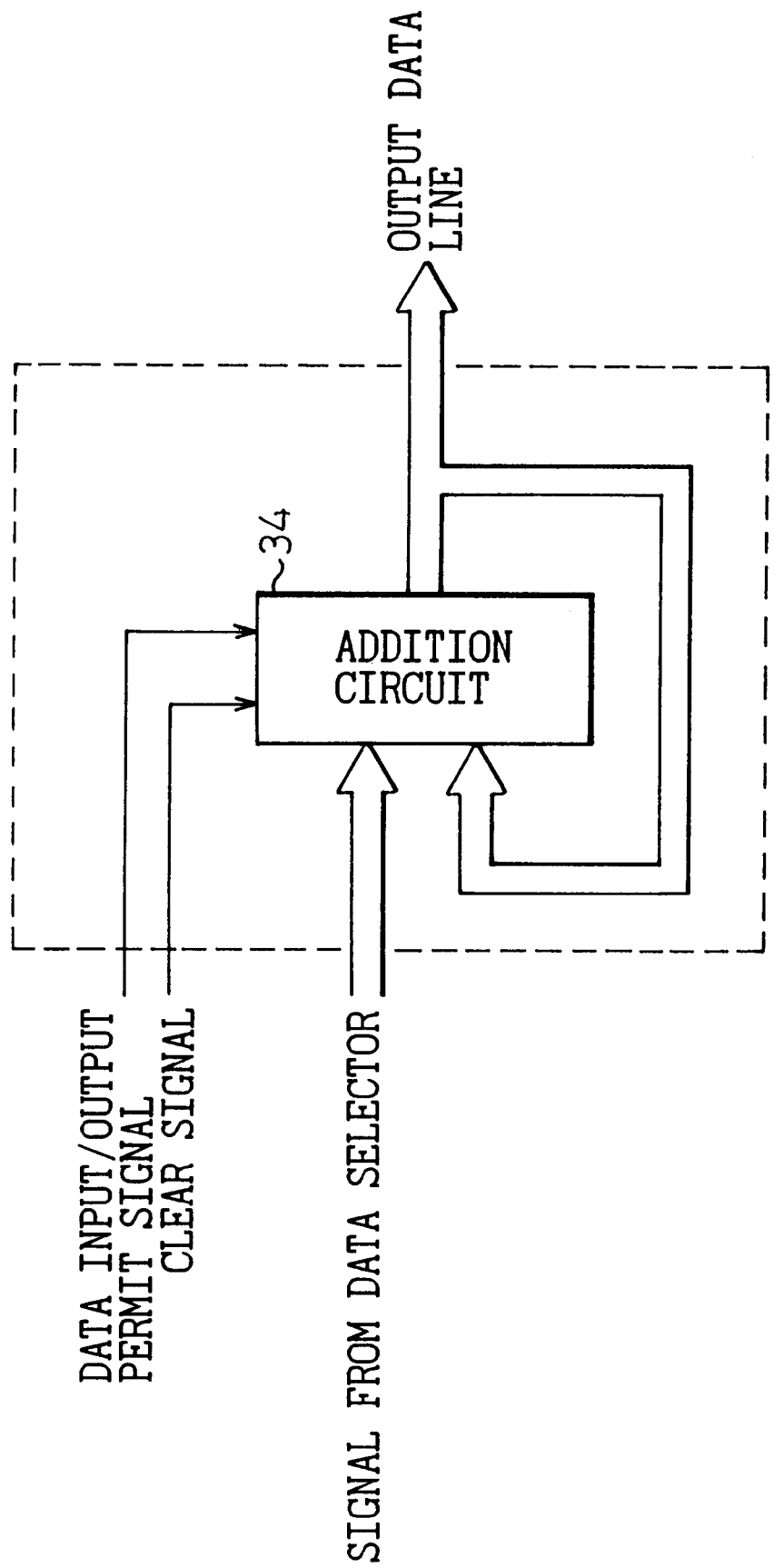
FIG. 33 is a circuit diagram showing the construction of a parity check code generation circuit according to the third embodiment.

FIG. 3 shows the third embodiment of the linear shift register circuit for generating the data check code by using a checksum, and hereby generates a 16-bit checksum. In FIG. 33, the data input/output permit signal and the clear signal are the same as those explained with reference to FIG. 15. Reference numeral 34 denotes an addition circuit for calculating the checksum, which is initialized by the clear signal and executes the checksum calculation in synchronism with the data input/output permit signal. The calculation result of the addition circuit 34 is outputted to the output data line. The signal of the output data line is stored again in the addition circuit 34 and is used for the addition with the data inputted next to the addition circuit 34.

As described above, the present invention provides the data verification method and apparatus in the data transfer using the ATA interface. The error detection method does not add physical signal lines to the ATA interface but can detect an error, which cannot be detected by the parity, by using the present invention.

The present invention can be used by expanding the specification of the conventional ATA interfaces and can be used in combination with the conventional specification. Among them, the method which involves the smallest change of the specification is the method which expands the write DMA and read DMA commands and in which the external recording unit 10 reports the data check code value calculated on the side of the external recording unit 10 to the data processor 6 through the task file register such as the error register.

Furthermore, because reliability of the data can be improved, the external recording unit using the ATA interface for an external storage device of a mini-computer or a main frame can be used as the external recording unit 10 besides a personal computer.

As explained above, according to the transfer data verification method and apparatus in the data processor equipped with the external recording unit having the ATA interface of the present invention, the error in the data transfer can be prevented and the data can be guaranteed equivalently to, or more reliably than, the parity system while securing compatibility with the data processor of the conventional ATA interface specification.

In the ATA interface, reliability at the time of the high speed data transfer can be improved by providing the function capable of confirming correctness of the data. Since the operation can be executed by the conventional ATA interface specification, the present invention can coexist with conventional products.

What is claimed is:

1. A method of verifying a data transfer in a data processor incorporating therein a main board having a microprocessor mounted thereto and an external recording unit for storing data, for executing data transfer between said main board and said external recording unit, comprising:

a first stage in which a data check code having a predetermined width is calculated on the side of said data processor in accordance with a predetermined calculation formula involving parity bits, by regarding the transfer data as a serial data when the data transfer is executed between said data processor and said external recording unit;

a second stage in which a data check code having a predetermined width is calculated on the side of said external recording unit in accordance with the same predetermined calculation formula as that of the side of said data processor by regarding transfer data as serial data when the data transfer is executed between said data processor and said external recording unit;

a third stage in which said data check code calculated on the side of said data processor is compared with said data check code calculated on the side of said external recording unit after the data transfer is completely finished, without comparing said parity bits; and a fourth stage in which the data transfer is judged as being effected without error when said two data check codes coincide with each other, and the data transfer is judged as not being effected normally when they do not.

2. A method of verifying a data transfer according to claim 1, which further comprises a fifth stage in which, when said data transfer is from said data processor to said external recording unit, said data check code is transferred from said data processor to said external recording unit in said third stage, said data check code calculated on the side of said data processor is compared on the side of said external recording unit with said data check code calculated on the side of said external recording unit, and the result of judgement of said fourth stage is reported from said external recording unit to said data processor.

3. A method of verifying a data transfer according to claim 2, wherein, when said data processor reports said data check code to said external recording unit, said data processor reports said data check code to said external recording unit by writing said data check code into a features register of said external recording unit by utilizing an undefined value of a command to existing external recording units.

4. A method of verifying a data transfer according to claim 1, wherein, when said data transfer is the transfer from said external recording unit to said data processor, said external recording unit sets, in said third stage, a code representing normalcy to a status register inside said external recording unit when said data transfer is effected normally and stores said data check code so calculated in an error register inside said external recording unit, and said data processor reads out said status register in order to confirm the operation result of said external recording unit, reads out said error register when said status register represents normalcy so as to obtain said data check code calculated on the side of said external recording unit, and compares said two data check codes.

5. A method of verifying a data transfer according to claim 1, wherein, when said data transfer is the transfer from said data processor to said external recording unit, said external recording unit sets in said third stage a code representing normalcy to a status register inside said external recording unit when said data transfer is effected normally and the data is written normally into a disk medium, and stores said data check code so calculated into an error register inside said external recording unit, and said data processor reads out said status register in order to confirm the operation result of said external recording unit, reads out said error register when said status register represents normalcy to obtain said data check code calculated on the side of said external recording unit, and compares said two data check codes.

6. A method of verifying a data transfer according to claim 1, wherein, when said data transfer is the transfer from said data processor to said external recording unit, said data processor transfers said data check code calculated in said first stage in succession to said data to said external recording unit after said data transfer is completed in said third stage so that said external recording unit can compare said two data check codes, and said external recording unit reports the result of judgement in said fourth stage to said data processor.

7. A method of verifying a data transfer according to claim 1, wherein, when said data transfer is the transfer from said external recording unit to said data processor, said external recording unit transfers said data check code calculated in said second stage to said data processor in succession to said data after said data transfer is completed in said third stage so that said data processor can compare said two data check codes.

8. A method of verifying a data transfer according to any of claims 1 through 7, wherein said data transfer is a PIO transfer.

9. A method of verifying a data transfer according to claim 1, wherein, when said data transfer is a PIO transfer of data from said data processor to said external recording unit;

in said first stage, a data check code smaller than a data width is calculated by regarding said transfer data as serial data whenever a sector data is transferred to said external recording unit;

in said second stage, a data check code smaller than the data width is calculated by regarding the sector data as serial data whenever said sector data is transferred;

in said third stage, the data check code calculated in said first stage is transferred by said data processor to said external recording unit in succession to the sector data whenever the transfer of each sector data is completed so that said external recording unit can compare said two data check codes; and said method further comprises a fifth stage in which said external recording unit reports the result of judgement of said fourth stage to said data processor whenever the transfer of each sector is completed.

10. A method of verifying a data transfer according to claim 1, wherein, when said transfer is a PIO transfer of data from said external recording unit to said data processor;

in said first stage, a data check code smaller than the data width is calculated by regarding sector data as serial data whenever the transfer data is transferred from said external recording unit;

in said second stage, a data check code smaller than the data width is calculated by regarding sector data as serial data whenever the sector data is transferred;

in said third stage, said data check code calculated in said second stage is transferred from said external recording unit to said data processor in succession to said sector data whenever transfer of each sector data is completed so that said data processor can compare said two data check codes; and in said fourth stage, coincidence/inequality of said two data check codes is judged whenever the transfer of each sector data is completed.

11. A method of verifying a data transfer according to claim 1, wherein said data check code is a CRC code.

12. A method of verifying a data transfer according to claim 11, wherein said CRC code calculates the parity of the transfer data and then allows the execution of the CRC calculation on the basis of said parity.

13. A method of verifying a data transfer according to claim 1, wherein said data check code is a checksum smaller than the data width.

14. An apparatus for verifying a data transfer in a data processor incorporating a main board having a microprocessor mounted thereto and an external recording unit for storing data, for transferring data between said main board and said external recording unit, comprising:

first means for calculating a data check code having a predetermined width on the side of said data processor by a predetermined calculation formula involving parity bits, by regarding said transfer data as serial data when the data transfer is effected between said data processor and said external recording unit;

second means for calculating a data check code having a predetermined length on the side of said external recording unit by the same predetermined calculation formula as that on the side of said data processor by regarding said transfer data as serial data when the data transfer is effected between said data processor and said external recording unit;

third means for comparing said data check code calculated on the side of said data processor with said data check code calculated on the side of said external recording unit when said data transfer is completely finished; and fourth means for judging that the data transfer is effected without error when said two data check codes coincide with each other, and judging that the data transfer is not normally effected when said two data check codes do not coincide with each other.

15. An apparatus for verifying a data transfer according to claim 14, wherein a features register is provided to said external recording unit, and when said data processor reports said data check code to said external recording unit, said data processor writes said data check code to said features register by utilizing an undefined value of a command to existing external recording units so as to report said data check code to said external recording unit.

16. An apparatus for verifying a data transfer according to claim 15, wherein said external recording unit includes means for comparing the value of said data check code reported from said data processor through said features register with the value of said data check code calculated on the side of said external recording unit, judging that data transfer is effected without error when they coincide with each other, judging that the data transfer contains an error when they do not coincide and reporting to said data processor that the data transfer is not normally effected.

17. An apparatus for verifying a data transfer according to claim 14, wherein a status register and an error register are provided to said external recording unit, said external recording unit sets a code representing normalcy to said status register and sets said data check code calculated on the side of said external recording unit to said error register when the data transfer is normally effected.

18. An apparatus for verifying a data transfer according to claim 17, wherein said data processor confirms a status in order to confirm the operation result of said external recording unit after completion of the data transfer, reads out said error register and reads out said data check code calculated on the side of said external recording unit when said status register represents normalcy, judges that the data transfer does not contain the error when said two data check codes coincide with each other, and judges that an error has occurred in the data transfer when they do not coincide.

19. An apparatus for verifying a data transfer according to claim 14, wherein, when the data is transferred from said data processor to said external recording unit, said data processor includes means for generating a data check code smaller than the data width by regarding all the transfer data as serial data, and transferring said calculated data check code to said external recording unit in the same procedure as the transfer of said data after all the data are transferred.

20. An apparatus for verifying a data transfer according to claim 19, wherein said external recording unit includes means for comparing said data check code transferred immediately after said data from said data processor with said data check code calculated on the side of said external recording unit, and transferring the result of comparison to said data processor.

21. An apparatus for verifying a data transfer according to claim 14, wherein, when said data is transferred from said external recording unit to said data processor, said external recording unit includes means for generating a data check code smaller than the data width by regarding all the transfer data as serial data, and transferring said calculated data check code to said data processor in the same procedure as that of said data after all of said data are transferred.

22. An apparatus for verifying a data transfer according to claim 21, wherein said data processor includes means for comparing said data check code transferred from said external recording unit immediately after said data with said data check code calculated on the side of said data processor.

23. An apparatus for verifying a data transfer according to claim 14, wherein, when a PI transfer of data is made from said data processor to said external recording unit, said data processor includes means for calculating a data check code smaller than the data with by regarding said transfer data as serial data whenever sector data is transferred to said external recording unit, and transferring consecutively said calculated data check codes to said external recording unit in the same procedure as said data transfer whenever the transfer of each sector data is completed.

24. An apparatus for verifying a data transfer according to claim 23, wherein said external recording unit includes means for comparing said data check code, whenever said check code is transferred immediately after the transfer of each sector data from said data processor, with said data check code calculated on the side of said external recording unit, and reporting the result of comparison to said data processor.

25. An apparatus for verifying a data transfer according to claim 14, wherein, when PIO transfer of data is effected from said external recording unit to said data processor, said external recording unit includes means for calculating a data check code smaller than the data width by regarding said transfer data as serial data whenever sector data is transferred to said data processor, and transferring consecutively said calculated data check code to said data processor in the same procedure as said data transfer whenever the transfer of each sector data is completed.

26. An apparatus for verifying a data transfer according to claim 25, wherein said data processor compares said data check code calculated on the side of said data processor with said data check code whenever it is transferred from said external recording unit immediately after the transfer of each sector data.

27. An apparatus for verifying a data transfer according to claim 24 or 25, wherein said external recording unit includes means for transferring as such said data check code transferred thereto from said data processor to said data buffer inside said external recording unit and writing it into a disk medium, and means for reading said data check code written into said disk medium, too, when the data is read out from said disk medium, and transferring it as such to said data processor.

28. An apparatus for verifying a data transfer according to claim 14, wherein said external recording unit includes means capable of reporting to said data processor that the data transfer with a code for verifying the data can be made among the response transfer data corresponding to a specific command generated from said data processor.

29. An apparatus for verifying a data transfer according to claim 28, wherein said external recording unit can represent to said data processor whether or not a data guarantee method in the data transfer is used in the response transfer data corresponding to a specific command generated from said data processor.

30. An apparatus for verifying a data transfer according to claim 14, wherein said data processor can designate to said external recording unit whether or not a data guarantee method is used in the transfer of a specific command when said data processor generates said specific command to said external recording unit.

31. An apparatus for verifying a data transfer according to claim 30, wherein said external recording unit can set whether or not to use said data verification method in the data transfer in accordance with an instruction from said data processor.

32. An apparatus for verifying a data transfer according to claim 14, wherein said data check code is a CRC code.

33. An apparatus for verifying a data transfer according to claim 32, wherein said CRC code calculates a parity of each transfer data and executes a CRC calculation on the basis of said parity.

34. An apparatus for verifying a data transfer according to claim 14, wherein said data check code is a checksum smaller than the data width.

* * * * *

UNITED STATES PATENT AND TRADEMARK OFFICE
CERTIFICATE OF CORRECTION

PATENT NO. : 5,928,372
DATED : July 27, 1999
INVENTOR(S) : Osamu Yoshida

Page 1 of 3

It is certified that error appears in the above-identified patent and that said Letters Patent is hereby corrected as shown below:

On the title page,

Under "[30] Foreign Application Priority Data" delete "Jan. 11, 1996" and insert --Nov. 1, 1996-- therefor Column 5, line 51, delete "DMACK" and insert --DMACK- -- therefor Column 5, line 53, delete "DMACK" and insert --DMACK- -- therefor Column 6, line 16, delete "-IOR" and insert --IOR- -- therefor

UNITED STATES PATENT AND TRADEMARK OFFICE
CERTIFICATE OF CORRECTION

PATENT NO.　:　　5,928,372　　　　　Page 2 of 3
DATED　　　:　　July 27, 1999
INVENTOR(S):　　Osamu Yoshida It is certified that error appears in the above-identified patent and that said Letters Patent is hereby corrected as shown below:

Column 6, line 32, delete "-IOW" and insert --IOW- -- therefor

Column 6, line 47, delete "-IOW or -IOR" and insert --IOW- or IOR- -- therefor

Column 6, line 57, delete "-IOW" and insert --IOW- -- therefor

Column 6, line 59, delete "-IOW" and insert --IOW- -- therefor

Column 6, line 60, delete "-IOW" and insert --IOW- -- therefor

Column 6, line 65, delete "-IOR" and insert --IOR- --

UNITED STATES PATENT AND TRADEMARK OFFICE
CERTIFICATE OF CORRECTION

PATENT NO. : 5,928,372
DATED : July 27, 1999
INVENTOR(S) : Osamu Yoshida

It is certified that error appears in the above-identified patent and that said Letters Patent is hereby corrected as shown below:

Column 7, line 1, delete "-IOR" and insert --IOR- -- therefor

Column 7, line 2, delete "-IOR" and insert --IOR- -- therefor

Column 7, line 3, delete "-IOR" and insert --IOR- -- therefor

Column 9, line 65, delete "cylinder, High" and insert --Cylinder High-- therefor Signed and Sealed this Twenty-fifth Day of April, 2000

Attest:

Q. TODD DICKINSON

*Attesting Officer*     *Director of Patents and Trademarks*